(12) United States Patent
Carre et al.

(10) Patent No.: US 12,455,288 B2
(45) Date of Patent: Oct. 28, 2025

(54) METHOD OF ISOLATING AND DETECTING CANCER STEM CELLS

(71) Applicant: CARCIDIAG BIOTECHNOLOGIES, Gueret (FR)

(72) Inventors: Vincent Carre, Gueret (FR); Aurélie Lacroix, Panazol (FR)

(73) Assignee: Sylvain Gnaho, Bonneval (FR)

( * ) Notice: Subject to any disclaimer, the term of this patent is extended or adjusted under 35 U.S.C. 154(b) by 1026 days.

(21) Appl. No.: 16/620,235

(22) PCT Filed: Jun. 1, 2018

(86) PCT No.: PCT/FR2018/051280
§ 371 (c)(1),
(2) Date: Dec. 6, 2019

(87) PCT Pub. No.: WO2018/224761
PCT Pub. Date: Dec. 13, 2018

(65) Prior Publication Data
US 2021/0080463 A1 Mar. 18, 2021

(30) Foreign Application Priority Data

Jun. 8, 2017 (FR) ..................................... 17/55137
Jun. 8, 2017 (FR) ..................................... 17/55139

(51) Int. Cl.
*G01N 33/574* (2006.01)

(52) U.S. Cl.
CPC ... *G01N 33/57423* (2013.01); *G01N 2333/42* (2013.01)

(58) Field of Classification Search
CPC ........................ C12N 5/0695; G01N 33/57469
See application file for complete search history.

(56) References Cited

U.S. PATENT DOCUMENTS

| | | | |
|---|---|---|---|
| 2010/0234762 A1* | 9/2010 | Pond ................... | A61K 49/0056 433/29 |
| 2015/0147765 A1 | 5/2015 | Ahn et al. | |
| 2016/0030535 A1* | 2/2016 | Poole ..................... | A61K 35/15 435/395 |
| 2018/0250360 A1* | 9/2018 | Tateno .................... | G01N 33/53 |
| 2018/0372748 A1* | 12/2018 | Lacroix ............ | G01N 33/57492 |
| 2022/0086814 A1* | 3/2022 | Sebeni .................. | H04W 72/23 |

FOREIGN PATENT DOCUMENTS

| | | | |
|---|---|---|---|
| CA | 2447400 A1 | 3/2005 | |
| WO | 2010/126452 A1 | 11/2010 | |
| WO | WO-2014164462 A1 * | 10/2014 | ............. A61K 35/15 |
| WO | WO-2017061449 A1 * | 4/2017 | ............. A61K 35/74 |
| WO | WO-2017093697 A1 * | 6/2017 | ........... C12N 5/0695 |

OTHER PUBLICATIONS

Remani et al (Oral Oncology, 1997, vol. 33, pp. 19-22) (Year: 1997).*
Vazhacharickal et al (International Journal of Innovative Research and Review, 2015, vol. 3, pp. 83-95) (Year: 2015).*
VectorLabs Lectin Brochure, 2016 (Year: 2016).*
Zhao et al (Molecular Medicine Reports, 2016, vol. 14, pp. 2598-2606) (Year: 2016).*
Chang et al (Proceedings of the National Academy of Science, 2008, vol. 105, pp. 11667-11672) (Year: 2008).*
International Preliminary Report on Patentability for Application No. PCT/FR2018/051280, dated Aug. 16, 2018.
International Search Report, dated Aug. 16, 2018, from corresponding PCT application No. PCT/FR2018/051280.
Tucker-Burden et al., "Lectins Identify Glycan Biomarkers on Glioblastoma-Derived Cancer Stem Cells", Stem Cells and Development, 2012, pp. 2374-2386, vol. 21, No. 13, XP055157421.
Tao et al., "Lectin microarrays identify cell-specific and functionally significant cell surface glycan markers", Glycobiology, 2008, pp. 761-769, vol. 18, No. 10, XP055337468.
Shinagawa et al., "Rapid isolation of homogeneous murine bronchoalveolar lavage fluid eosinophils by differential lectin affinity interaction and negative selection", Journal of Immunological Methods, 2000, pp. 65-72, vol. 237, No. 1-2, XP004192495.
Gaunitz et al., "Mucin-type proteins produced in the Trichoplusia ni and Spodoptera frugiperda insect cell lines carry novel O-glycans with phosphocholine and sulfate substitutions", Glycobiology, 2013, pp. 778-796, vol. 23, No. 7, XP055496536.
FR Search Report, dated Dec. 13, 2017, from corresponding FR application No. FR 1755139.
Rini, "Lectin Structure", Annual Review of Biophysics and Biomolecular Structure, 1995, vol. 24, pp. 551-577.
Brooks, "Lectin Histochemistry: Historical Perspectives, State of the Art, and the Future", Histochemistry of Single Molecules: Methods and Protocols, Methods in Molecular Biology, 2017, vol. 1560, DOI 10.1007/978-1-4939-6788-9_6, pp. 93-107.
Singh et al., "Insight of Lectins—A review", International Journal of Scientific & Engineering Research, Apr. 2012, vol. 3, Issue 4, ISSN 2229-5518, pp. 1-8.

* cited by examiner

Primary Examiner — Karen A. Canella
(74) Attorney, Agent, or Firm — NIXON & VANDERHYE, PC

(57) ABSTRACT

Disclosed is the in vitro use of at least one lectin which recognises the fucose alpha(1-2) galactose unit for labelling cancer stem cells of organs involved in respiration, in order to obtain labelled cancer stem cells of organs involved in respiration, in a biological sample. In one particular embodiment, the at least one lectin is chosen from the lectins *Ulex Europaeus* agglutinin 1 (UEA-1) or the homologue thereof, *Trichosanthes japonica* agglutinin II (TJA-II), *Agaricus Bisporus* agglutinin (ABA), *Amaranthus Caudatus* agglutinin (ACA), jacalin, Griffonia Simplicifolia lectin I (GSL-I) and Griffonia Simplicifolia lectin II (GSL-II). In one particular embodiment, the organ involved in respiration is chosen from the lungs, the larynx, the pharynx, the mouth, the nose, the throat, the tongue, the sinuses, the trachea and the saliva glands including the tonsils and the parotid gland.

14 Claims, 3 Drawing Sheets

METHOD OF ISOLATING AND DETECTING CANCER STEM CELLS

BACKGROUND OF THE INVENTION

Field of the Invention

This invention concerns a method of isolating and detecting cancer stem cells (CSCs) of organs involved in respiration.

Description of the Related Art

Lung cancer is the leading cause of cancer deaths in France for men and the second for women, the first being breast cancer. It affects 37,000 people per year. The 5-year survival rate is very low, hence the notion of early diagnosis that occurs in this pathology where the present invention makes sense.

Lung cancer, like other types of cancer, has many factors leading to a high mortality rate in the concerned population, with in particular a late diagnosis, which results in both a more advanced cancer called metastatic and a high recurrence rate. Indeed, this rate directly depends on the stage at which the cancer is detected. Nevertheless, it should be noted that even when the detection stage is early, the recurrence rate remains high because some parameters are not yet taken into account.

Indeed, this phenomenon of recurrence can be explained in part by tumour progression as well as resistance mechanisms based on the existence of cancer stem cells or tumour initiating cells or pre-cancer cells, which are not taken into account to date. The therapeutic escape of the tumor to radio- and chemo-therapeutic treatments depends on the presence of these cells within the tumor. Therefore, the detection of these cells in tumor tissue is one way to define the level of aggressiveness of the tumor. The characterization of biomarkers specific to cancer stem cells is therefore of great diagnostic and prognostic interest in the treatment of cancer. However, there are currently no specific markers for cancer stem cells (CSCs) that allow their discrimination with certainty from other tumour cells.

The major difficulties in isolating and characterizing CSCs lie in the small size of their population (3 to 4% of the tumor population) and the absence of specific markers.

There is therefore a significant need for early diagnosis and development of a new method of detecting and/or isolating cancer stem cells.

Early identification of the presence of cancer stem cells would provide clinicians with a predictive factor for disease.

In addition, it would offer new perspectives in the diagnosis of cancer dangerousness. Indeed, the additional information available to the clinician should make it possible to limit the risk of recurrence or aggravation of the disease by adapting treatment.

Cancers of organs involved in respiration besides the lungs are frequent cancers in France: this is the 4th type of cancer in men, accounting for 10% of all cancers. In addition, there is a wide disparity between the regions of North and South of France, with an incidence rate more than 20% higher in the North than the national average. There are also strong social inequalities in mortality.

In 2012, the incidence of cancers of organs involved in respiration besides lung cancer is estimated at 11,320 new cases, 71% of which affect men.

In descending order of frequency, it is:
Pharyngeal cancers: 47%.
Oral cavity cancers, including tongue cancer: 25%.
Laryngeal cancers: 25%.
Salivary gland cancers: 6%.
Cancer of the sinuses of the face: <1%

These are conditions that affect mainly men (1 woman for every 7 men) and especially smokers.

SUMMARY OF THE INVENTION

The present invention concerns a specific detection method since it only recognizes cancerous stem cells of organs involved in respiration and is therefore more effective than conventional methods. In addition, its implementation is faster than existing methods, as the latter are not generalizable due to their non-reproducibility and include both cancerous stem and non-stem cells.

"Organs involved in respiration" means organs actively involved in respiration, i.e. actively involved in inhalation and exhalation, and organs located on the passage of the air breathed in.

Thus, for the purposes of the present invention, the "organs involved in respiration" are the lungs, larynx, pharynx, mouth, nose, throat, tongue, sinus, trachea and salivary glands (tonsils and parotid gland).

In a first aspect, the present invention concerns the use, as a means of marking, of a lectin, for detecting and/or isolating cancer stem cells of organs involved in respiration.

In a second aspect, the present invention concerns a method of isolating and detecting cancer stem cells of organs involved in respiration comprising the labelling of cancer stem cells of organs involved in respiration with at least one lectin.

In a third aspect, the present invention concerns a method of diagnosing the aggressiveness and/or risk of recurrence of cancer of organs involved in respiration to define a prognostic value for the therapeutic adaptation of cancer of organs involved in respiration including a step of isolating and/or detecting cancer cells of organs involved in respiration.

In a fourth aspect, the present invention concerns a kit comprising a lectin for detecting or isolating cancer stem cells of organs involved in respiration.

The present invention is based on the identification by the Inventors of the existence of the fucose α 1-2 galactose group, and more particularly the fucose α 1-2 galactose β 1-4 N-acetylglucosamine group, on the surface of cancer stem cells of organs involved in respiration as well as the possibility of its recognition by lectins, allowing to detect and isolate these cells.

For the purposes of the present invention, "means of marking cancer stem cells of organs involved in respiration" means a substance capable of specifically binding to a group on the surface of cancer stem cells of organs involved in respiration.

According to a general aspect, the present invention concerns the in vitro use of at least one lectin recognizing the fucose α 1-2 galactose group for the labelling of cancer stem cells of organs involved in respiration, to obtain labelled cancer stem cells of organs involved in respiration, in a biological sample.

In a particular embodiment, the fucose α 1-2 galactose group is more particularly the fucose α 1-2 galactose β 1-4 N-acetylglucosamine group.

Thus, the present invention also concerns the in vitro use of at least one lectin recognizing the fucose α 1-2 galactose β 1-4 N-acetylglucosamine group for the labelling of cancer stem cells of organs involved in respiration, to obtain labelled cancer stem cells of organs involved in respiration, in a biological sample.

In a particular embodiment, lectins according to the present invention are chosen from the lectins *Ulex Europaeus* agglutinin 1 (UEA-1), *Agaricus Bisporus* agglutinin (ABA), *Amaranthus Caudatus* agglutinin (ACA), jacaline, GSL-I and GSL-II Griffonia Simplicifolia lectin I (GSL-I) and Griffonia Simplicifolia lectin II (GSL-II) and their homologues.

For example, lectin *Trichosanthes japonica* agglutinin II (TJA-II) is a homologue of lectin UEA-1.

Thus, the present invention also concerns the in vitro use of at least one lectin chosen from the lectins *Ulex Europaeus* agglutinin 1 (UEA-1) or its homologues *Trichosanthes japonica* agglutinin II (TJA-II), *Agaricus Bisporus* agglutinin (ABA), *Amaranthus Caudatus* agglutinin (ACA), jacaline, GSL-I and GSL-II Griffonia Simplicifolia lectin I (GSL-I) and Griffonia Simplicifolia lectin II (GSL-II), to obtain labelled cancer stem cells of organs involved in respiration, in a biological sample.

These lectins are well known to the skilled person and are commercially available (notably by Vector Laboratories). Some reviews list their structure (*Lectin Structure*, Rini J M, Annu Rev Biophys Biomol Struct, 1995; 24: 551-77) while others more recent describe their entire history (*Insight of Lectins-A review*, Singh et al. International Journal of Scientific and Engineering Research, Volume 3, Issue 4, April 2012) and advances in their use, particularly in immunohistochemistry (*Lectin Histochemistry: Historical Perspectives, State of the Art, and the Future*, Brooks S A, Methods Mol Biol, 2017, 1560:93-107).

In a particular embodiment, the present invention concerns the in vitro use of lectin UEA-1 or its homologue TJA-II, to obtain labelled cancer stem cells of organs involved in respiration, in a biological sample.

For the purpose of the present invention, a biological sample is a sample taken from a patient with cancer of organs involved in respiration or likely to have a cancer of organs involved in respiration.

For the purpose of the present invention, a "cancer of organs involved in respiration" may be lung cancer, laryngeal cancer, pharyngeal cancer, oral cancer, nose cancer, throat cancer, tongue cancer, sinus cancer, tracheal cancer or cancer of the salivary glands (i.e. tonsil cancer and/or parotid gland cancer).

In the present invention, the terms "lung cancer" and "pulmonary cancer" may be used interchangeably.

This sample is likely to contain cancer stem cells.

Contrary to or in addition to the usual analyses in anatomo-pathology, the use of lectins according to the present invention ultimately makes it possible to characterize the said sample at an early stage, as being pre-tumoral or tumoral.

By the term "pre-tumoral" we mean upstream of the tumor with a potential that may or may not bring a tumor character to the sample.

Indeed, anatomo-pathology studies macroscopic and microscopic lesions of tissues taken from living beings that are sick or have died by biopsy, smear or extemporaneous biopsy. This branch of medicine thus focuses on the morphological study of macroscopic and microscopic anomalies of biological tissues and collected pathological cells, but not on the search for cancer stem cells and therefore not on the self-replicating properties of cells.

Anatomo-pathology does not allow, on the basis of morphological studies, to establish an early characterization of the sample because the observed anomalies occur at a stage where the self-replicating nature of cancer cells is already expressed.

On the contrary, since the present invention is directly concerned with the detection of the presence of cancer stem cells, it makes it possible to characterize the sample at an earlier stage than anatomo-pathology, i.e. even before the cancer stem cells have been able to express their self-replication character leading to morphological anomalies in the tissues.

The method according to the present invention can be used after an anatomo-pathological analysis. In this case the sample is characterized as tumor, likely to be tumour or not suspected to be tumor following the anatomopathology study. The method according to the present invention being specifically concerned with cancer stem cells, it allows in this case to confirm the diagnosis obtained in anatomo-pathology, or to invalidate this diagnosis.

Indeed, in the case where a sample is not suspected of being tumor in anatomo-pathology, the present invention may make it possible to invalidate this diagnosis by revealing the tumor or pre-tumor character of the said sample because it is based on parameters different from anatomo-pathology, in this case the presence and possibly the quantification of cancer stem cells.

According to an embodiment, the present invention concerns the in vitro use of a mixture of at least two lectins chosen from UEA-1 or its homologue TJA-II, ABA, ACA, jacaline, GSL-I and GSL-II.

Thus, in an embodiment, the present invention concerns the in vitro use of a mixture of two lectins chosen from the following mixtures: (UEA-1, ABA), (UEA-1, ACA), (UEA-1, GSL-I), (UEA-1, GSL-II), (ABA, ACA), (ABA, Jacaline), (ABA, GSL-I), (ABA, GSL-II), (ACA, Jacaline), (ACA, GSL-I), (ACA, GSL-II), (Jacaline, GSL-I), (Jacaline, GSL-II), (GSL-I, GSL-II), (TJA-II, ABA), (TJA-II, ACA), (TJA-II, Jacaline), (TJA-II, GSL-I), (TJA-II, GSL-II).

In a particular embodiment, the present invention concerns the in vitro use of a mixture of the two lectins GSL-I and GSL-II.

In a particular embodiment, the present invention concerns the in vitro use of a mixture of the two lectins GSL-I and UEA-1 or its homologue TJA-II.

According to an embodiment, the present invention concerns the in vitro use of a mixture of at least three lectins chosen from UEA-1 or its homologue TJA-II, ABA, ACA, jacaline, GSL-I and GSL-II, in particular the mixture of UEA-1 or its homologue TJA-II, jacaline and ABA, or the mixture of UEA-1 or its homologue TJA-II, jacaline and ACA.

Thus, in a particular embodiment, the present invention concerns the in vitro use of a mixture of three lectins chosen from the following mixtures:

(UEA-1, ABA, ACA), (UEA-1, ABA, Jacaline), (UEA-1, ABA, GSL-I), (UEA-1, ABA, GSL-II), (UEA-1, ACA, Jacaline), (UEA-1, ACA, GSL-I), (UEA-1, ACA, GSL-II), (UEA-1, Jacaline, GSL-I), (UEA-1, Jacaline, GSL-II), (UEA-1, GSL-I, GSL-II), (ABA, ACA, Jacaline), (ABA, ACA, GSL-I), (ABA, ACA, GSL-II), (ABA, Jacaline, GSL-I), (ABA, Jacaline, GSL-II), (ABA, GSL-I, GSL-II), (ACA, Jacaline, GSL-I), (ACA, Jacaline, GSL-II), (ACA, GSL-I, GSL-II), (Jacaline, GSL-I, GSL-II), (TJA-II, ABA, ACA), (TJA-II, ABA, Jacaline), (TJA-II, ABA, GSL-I), (TJA-II, ABA, GSL-II), (TJA-II, ACA, Jacaline), (TJA-II, ACA, GSL-I), (TJA-II, ACA, GSL-II), (TJA-II, Jacaline, GSL-I), (TJA-II, Jacaline, GSL-II), (TJA-II, GSL-I, GSL-II).

In an embodiment, the present invention concerns the in vitro use of the mixture of the three lectins (UEA-1, jacaline, ABA), or the mixture of (UEA-1, jacaline, ACA).

The use of two or three lectins allows in some cases a better specificity of the marking of cancer stem cells.

The combination of the two GSLs or of UEA-1 and GSL-I or of TJA-II and GSL-I are advantageous embodiments in detecting and isolating CSCs.

In a particular embodiment, the present invention concerns the in vitro use of at least one lectin recognizing the fucose α 1-2 galactose group for the labelling of pulmonary cancer stem cells, chosen from the lectins UEA-1 or its homologue TJA-II, ABA, ACA, jacaline, GSL-I and GSL-II, to obtain labelled pulmonary cancer stem cells, in a biological sample, in particular at least two lectins chosen from UEA-1, ABA, ACA, jacaline, GSL-I and GSL-II, in particular the mixture of GSL-I and GSL-II or the mixture UEA-1 and GSL-I, in particular at least three lectins selected from UEA-1, ABA, ACA, jacaline, GSL-I and GSL-II, in particular the mixture of UEA-1, jacaline and ABA, or the mixture of UEA-1, jacaline and ACA.

The lectin used in the invention can be combined.

For the purpose of the invention, the term "conjugate" means that lectin is covalently bound to another molecule.

According to an embodiment, the present invention concerns the in vitro use of at least one lectin recognizing the fucose α 1-2 galactose group for the labelling of cancer stem cells of organs involved in respiration, wherein said labelling of cancer stem cells of organs involved in respiration is carried out with a lectin conjugated to a label selected from: a fluorophore, a radioisotope, an enzyme, gold beads or biotin.

According to an embodiment, the present invention concerns the in vitro use of at least one lectin recognizing the fucose α 1-2 galactose β 1-4 N-acetylglucosamine group for the labelling of cancer stem cells of organs involved in respiration, wherein said labelling of cancer stem cells of organs involved in respiration is carried out with a lectin conjugated to a label selected from: a fluorophore, a radioisotope, an enzyme, gold beads or biotin.

According to an embodiment, said lectin is selected from UEA-1 or its homologue TJA-II, ABA, ACA, jacaline, GSL-I and GSL-II lectins.

Thus, in a particular embodiment, said lectin is conjugated to a fluorophore.

For the purpose of the invention, a fluorophore can be any fluorophore that can be used for flow cytometry. Such fluorophores are commercially available. Examples include Alexa fluor, in particular Alexa fluor 350, 405, 430, 488, 500, 514, 532, 532, 546, 555, 568, 594, 610, 610, 633, 647, 660, 680, 700, 750 or 790, fluorescein isothiocyanate (FITC), Rhodamine, allophycocyanin (APC) and Phycoerythrin (PE).

Advantageously, fluorophore is chosen from rhodamine, FITC or Alexa fluor, in particular Alexa fluor 488, Alexa fluor 594 or Alexa fluor 633.

This characterization of the fluorophore for the purpose of the invention applies to any embodiment of the present invention involving a fluorophore.

In another particular embodiment, said lectin is conjugated to a radioisotope.

For the purpose of the invention, a radioisotope is chosen from iodine 125, tritium or technetium.

In another particular embodiment, said lectin is conjugated to an enzyme.

For the purpose of the invention, the enzyme is an enzyme catalyzing the formation of a coloured product, i.e. an enzyme using a chromogenic substrate, or an enzyme catalyzing the formation of a luminescent product, i.e. an enzyme using a chemiluminescent substrate.

For the purpose of the invention, a "chromogenic substrate" refers to a substrate giving a coloured product after conversion by an enzyme.

For the purpose of the invention, a "chemiluminescent substrate" refers to a substrate giving a luminescent product after conversion by an enzyme.

In a particular embodiment, the said enzyme catalyzing the formation of a coloured product is chosen from horseradish peroxidase (HRP), alkaline phosphatase, glucose oxidase or β-galactosidase.

In the particular case of HRP, the chromogenic substrate is chosen from 3,3'-Diaminobenzidine (DAB), 3,3',5,5,5'-Tetramethylbenzidine (TMB), or 2,2'-azino-bis(3-ethylbenzothiazoline-6-sulphonic acid) (ABTS).

In the particular case of alkaline phosphatase, the chromogenic substrate is NBT (Tetrazolium Nitroblue) and BCIP (bromochlorylindolophosphate).

In a particular embodiment, the said enzyme catalyzing the formation of a luminescent product is HRP and the luminescent substrate is luminol.

In another particular embodiment, said lectin is conjugated to gold beads.

In another particular embodiment, said lectin is combined with biotin.

It has also been demonstrated by the Inventors that cancer stem cells of organs involved in respiration can be detected via the use of a lectin recognizing the fucose α 1-2 galactose group for the labelling of said cancer stem cells of organs involved in respiration.

In a particular embodiment, the said fucose α 1-2 galactose group is the fucose α 1-2 galactose β 1-4 N-acetylglucosamine group. Thus, cancer stem cells of organs involved in respiration can be detected via the use of a lectin recognizing the fucose α 1-2 galactose β 1-4 N-acetylglucosamine group for the labelling of said cancer stem cells of organs involved in respiration.

For the purpose of the present invention, "detection" means the identification by UV/visible, luminescence, fluorescence, radioactivity, enzymology methods, the presence of cancer stem cells of organs involved in respiration in a biological sample.

Thus, the present invention also concerns the use of at least one lectin recognizing the fucose α 1-2 galactose group, more particularly the fucose α 1-2 galactose β 1-4 N-acetylglucosamine group, for the labelling of cancer stem cells of organs involved in respiration followed by the detection of cancer stem cells in a biological sample, via the detection of said conjugated lectin.

In one embodiment, lectin can be covalently conjugated to a fluorophore.

Thus, according to one embodiment, the present invention concerns the in vitro use of at least one lectin recognizing the fucose α 1-2 galactose group, more particularly the fucose α 1-2 galactose β 1-4 N-acetylglucosamine group, for the labelling of cancer stem cells of organs involved in respiration, wherein said labelling of cancer stem cells of organs involved in respiration is carried out with a lectin conjugated to a fluorophore and is followed by the detection of said cancer stem cells of organs involved in respiration by fluorescence microscopy or by fluorescence reader.

In one embodiment, lectin can be combined with a radioisotope.

Thus, according to one embodiment, the present invention concerns the in vitro use of at least one lectin recognizing the fucose α 1-2 galactose group, more particularly the fucose α 1-2 galactose β 1-4 N-acetylglucosamine group, for the labelling of cancer stem cells of organs involved in respiration, wherein said labelling of cancer stem cells of organs involved in respiration is carried out with lectin conjugated to a radioisotope and is followed by the detection of said labelled cancer stem cells of organs involved in respiration by a gamma camera.

In one embodiment, lectin can be conjugated to an enzyme using a chromogenic substrate or a chemiluminescent substrate.

Thus, according to one embodiment, the present invention concerns the in vitro use of at least one lectin recognizing the fucose α 1-2 galactose group, more particularly the fucose α 1-2 galactose β 1-4 N-acetylglucosamine group, for the labelling of cancer stem cells of organs involved in respiration, wherein said labelling of cancer stem cells of organs involved in respiration is carried out with lectin conjugated to horseradish peroxidase and is followed by detection of said labelled cancer stem cells of organs involved in respiration by luminescence microscopy or by a luminescence reader by adding a chemiluminescent substrate, such as luminol.

In another embodiment, the present invention concerns the in vitro use of at least one lectin recognizing the fucose α 1-2 galactose group, more particularly the fucose α 1-2 galactose β 1-4 N-acetylglucosamine group, for the labelling of cancer stem cells of organs involved in respiration, wherein said labelling of cancer stem cells of organs involved in respiration is carried out with lectin conjugated to horseradish peroxidase and is followed by detection of said labelled cancer stem cells of organs involved in respiration by UV/visible microscopy or by absorbance reader, by adding a chromogenic substrate selected from 3,3'-Diaminobenzidine (DAB), 3,3',5,5,5'-Tetramethylbenzidine (TMB), or 2,2'-azino-bis(3-ethylbenzothiazoline-6-sulphonic acid) (ABTS).

In one embodiment, lectin can be combined with gold beads.

Thus, according to one embodiment, the present invention concerns the in vitro use of at least one lectin recognizing the fucose α 1-2 galactose group, more particularly the fucose α 1-2 galactose β 1-4 N-acetylglucosamine group, for the labelling of cancer stem cells of organs involved in respiration, in which said labelling of cancer stem cells of organs involved in respiration is carried out with a lectin conjugated to gold beads and is followed by
the detection of said labelled cancer stem cells of organs involved in respiration by electron microscopy.

In one embodiment, lectin can be combined with biotin to give a biotinylated lectin.

Thus, according to one embodiment, the present invention concerns the in vitro use of at least one lectin recognizing the fucose α 1-2 galactose group, more particularly the fucose α 1-2 galactose β 1-4 N-acetylglucosamine group, for the labelling of cancer stem cells of organs involved in respiration, in which said labelling of cancer stem cells of organs involved in respiration is carried out with a lectin conjugated to biotin and is followed by
the detection of said cancer stem cells of organs involved in respiration labelled by lectin conjugated to biotin by one of the previously described embodiments in which said label, fluorophore, radioisotope, enzyme, gold beads, is itself conjugated with streptavidin or avidin.

When the labelling of cancer stem cells of organs involved in respiration is performed with lectin conjugated to biotin and is followed by
the detection of said cancer stem cells of organs involved in respiration labelled by lectin conjugated to biotin, the detection is done:
 by fluorescence microscopy when using a fluorophore conjugated to streptavidin or avidin,
 by luminescence reader when using an enzyme using a chemiluminescent substrate conjugated to streptavidin or avidin
 by gamma camera when using a radioisotope combined with streptavidin or avidin,
 by electron microscopy when using gold beads conjugated to streptavidin or avidin,
 by UV/visible microscopy when using an enzyme using a chromogenic substrate conjugated to streptavidin or avidin.

It has also been demonstrated by the Inventors that cancer stem cells of organs involved in respiration can be isolated via the use of a lectin recognizing the fucose α 1-2 galactose group for the labelling of said cancer stem cells of organs involved in respiration.

In a particular embodiment, the said fucose α 1-2 galactose group is the fucose α 1-2 galactose β 1-4 N-acetylglucosamine group. Thus, cancer stem cells of organs involved in respiration could be isolated via the use of a lectin recognizing the fucose α 1-2 galactose β 1-4 N-acetylglucosamine group for the labelling of said cancer stem cells of organs involved in respiration.

By "Isolating cancer stem cells of organs involved in respiration" it means the extraction of cancer stem cells of organs involved in respiration of a biological sample, free of any other cell type.

Thus, the present invention also concerns the use of at least one lectin recognizing the fucose α 1-2 galactose group, more particularly the fucose α 1-2 galactose β 1-4 N-acetylglucosamine group, for the labelling of cancer stem cells of organs involved in respiration followed by isolating cancer stem cells in a biological sample, said lectin being conjugated.

This isolation allows the sample to be enriched with cancer stem cells of organs involved in respiration.

By the term "enrichment", it means that the proportion of cancer stem cells of organs involved in respiration relative to the total cells in the sample is increased, due to the depletion of the sample in non-stem cancer cells.

This is a sample enriched with cancer stem cells of organs involved in respiration.

Thus, by the expression "isolating cancer stem cells of organs involved in respiration" in the purpose of the invention, we mean "enrichment of the sample with cancer stem cells of organs involved in respiration".

Thus, for the purpose of the present invention, "isolation" also means obtaining a population of cells enriched with cancer stem cells of organs involved in respiration from a biological sample. For the purpose of the present invention, the term "enriched" refers to a population of cells in which the ratio number of cancer stem cells/total number of cells is at least 8 as determined by the ratio of Epcam high+cells/Epcam high–cells by flow cytometry.

Enrichment of the sample with cancer stem cells allows a more reliable and easier detection and quantification of cancer stem cells because the desired cell population is then present in a larger proportion in the sample.

Thus, it has been demonstrated by the Inventors that a biological sample can be enriched with cancer stem cells in a particularly effective way by using a lectin that recognizes the fucose α 1-2 galactose group.

In a particular embodiment, the said fucose α 1-2 galactose group is the fucose α 1-2 galactose β 1-4 N-acetylglucosamine group. Thus, it has been demonstrated by the Inventors that a biological sample can be enriched with cancer stem cells in a particularly effective way by using a lectin that recognizes the fucose α 1-2 galactose β 1-4 N-acetylglucosamine group.

In a particular embodiment, the isolation of cancer stem cells labelled by at least one lectin recognizing the fucose α 1-2 galactose group, more particularly the fucose α 1-2 galactose β 1-4 N-acetylglucosamine group, may be followed by a cellular amplification step. Thus, after the isolation of the cells, these can be cultured in a medium that make it possible to increase the quantity of cancer stem cells of organs involved in respiration.

In one embodiment, the present invention concerns the in vitro use of at least one lectin recognizing the fucose α 1-2 galactose group, more particularly the fucose α 1-2 galactose β 1-4 N-acetylglucosamine group, for the labelling of cancer stem cells of organs involved in respiration, wherein said labelling of cancer stem cells of organs involved in respiration is carried out with a conjugated lectin and is followed by the isolation of said labelled cancer stem cells of organs involved in respiration.

In a particular embodiment, lectin is conjugated to biotin and the isolation of labelled cancer stem cells of organs involved in respiration is carried out via a support functionalized with streptavidin or avidin.

In this embodiment, cancer stem cells of organs involved in respiration labelled with lectin conjugated to biotin are fixed on the support functionalized with streptavidin or avidin, by the biotin-streptavidin affinity or biotin-avidin affinity.

The support can also be made of glass, polydimethylsiloxane (PDMS), silicone, or plastic such as polymethylmethacrylate (PMMA), polystyrene (PS) or cyclic olefin copolymer (COC).

Examples of appropriate support are given in the review by Kim et al (*Protein immobilization techniques for microfluidics assays*, Kim et al., Biomicrofluidics, 7, 041501, 2013).

By the term "functionalized" it means that the support is chemically modified to be covered with immobilized streptavidin or avidin.

The review Kim et al., previously cited, gives examples of support functionalization.

In a more particular embodiment, the said support is made of magnetic beads.

Thus, according to a particular embodiment of the invention, said support consists of magnetic beads and the isolation of said labelled cancer stem cells of organs involved in respiration is carried out by magnetic sorting in the presence of a magnet.

In this embodiment, the cancer stem cells of organs involved in respiration with a lectin conjugated to biotin, are fixed on magnetic beads functionalized with streptavidin or avidin, by biotin-streptavidin affinity or biotin-avidin affinity.

Under the influence of a magnet, the cancer stem cells of organs involved in respiration fixed on the magnetic beads are isolated within the sample.

This isolation may be followed by the recovery of the sample enriched with cancer stem cells, by removal of the supernatant, and then by eluting the cancer stem cells linked to the said support.

The said elution can be carried out under acidic conditions to break the streptavidin-biotin or avidin-biotin bond.

In the particular case where said support consists of magnetic beads and the streptavidin or avidin is bound to the magnetic beads by a DNA bond, said elution is achieved by DNAse treatment.

According to another embodiment, the lectin used for the labelling is a lectin conjugated to a fluorophore and the isolation is carried out by cell sorting in flow cytometry.

Cell sorting by flow cytometry thus makes it possible to obtain a fraction of the sample enriched with cancer stem cells of organs involved in respiration.

Flow cytometry is a technique well known to the skilled person that especially allows cells to be sorted into different fractions according to their fluorescent labelling.

Cellular sorting by flow cytometry as part of the invention thus makes it possible to obtain:
on the one hand, a fraction of the sample containing cancer stem cells of organs involved in respiration labelled with a lectin conjugated to a fluorophore, and
on the other hand, a fraction of the sample containing the other cell types contained in the original sample.

The invention also allows the labelling, isolation and subsequent detection of cancer stem cells of organs involved in respiration using at least one conjugated lectin.

In another embodiment, the present invention concerns the in vitro use of at least one lectin recognizing the fucose α 1-2 galactose group for the labelling of cancer stem cells of organs involved in respiration, wherein said labelling of cancer stem cells of organs involved in respiration with a conjugated lectin is followed by the isolation of said labelled cancer stem cells of organs involved in respiration
and then detecting said isolated cancer stem cells of organs involved in respiration, by
re-labelling said isolated cancer stem cells of organs involved in respiration with a lectin conjugated to a label selected from: a fluorophore, a radioisotope, an enzyme, gold beads or biotin.

In a particular embodiment, the present invention concerns the in vitro use of at least one lectin recognizing the fucose α 1-2 galactose β 1-4 N-acetylglucosamine group for the labelling of cancer stem cells of organs involved in respiration, wherein said labelling of cancer stem cells of organs involved in respiration with a conjugated lectin is followed by the isolation of said labelled cancer stem cells of organs involved in respiration
and then detecting said isolated cancer stem cells of organs involved in respiration, by
re-labelling said isolated cancer stem cells of organs involved in respiration with a lectin conjugated to a label selected from: a fluorophore, a radioisotope, an enzyme, gold beads or biotin.

Thus in another embodiment, the present invention concerns the in vitro use of at least one lectin recognizing the fucose α 1-2 galactose group, more particularly the fucose α 1-2 galactose β 1-4 N-acetylglucosamine group, for the labelling of cancer stem cells of organs involved in respiration, wherein said labelling of cancer stem cells of organs involved in respiration is carried out with lectin conjugated to a biotin or a fluorophore and is followed by
the isolation of said labelled cancer stem cells of organs involved in respiration
via a support functionalized with streptavidin or avidin in the case of lectin conjugated to biotin as described in the present invention, or
via flow cytometry in the case of lectin conjugated with a fluorophore, as described in the present invention, to obtain cancer stem cells of organs involved in respiration that are marked and isolated, then by a re labelling with a lectin conjugated according to the invention, of said labelled and isolated cancer stem cells of organs involved in respiration, followed by the detection of said cells according to the detection methods described in the present application.

According to one embodiment of the present invention, the said biological sample from which cancer stem cells are isolated or detected is a biological sample of organs involved in respiration.

The biological sample of organs involved in respiration may especially be a tumour biopsy from a patient with cancer of organs involved in respiration or a biopsy from a patient suspected of having such a cancer.

The biological sample of organs involved in respiration may also be a cancer cell line of organs involved in respiration or a tumor induced in an animal by injection of cancer cell lines, for example in mice or rats. The cell line is preferably a cancer cell line of organs involved in respiration. According to this embodiment, the induced tumor contains cancer stem cells of organs involved in respiration that are advantageously isolated from other tumor cells in order to be studied.

According to one embodiment, the present invention concerns the in vitro use of at least one lectin recognizing the fucose α 1-2 galactose group for the labelling of cancer stem cells of organs involved in respiration, to obtain labelled cancer stem cells of organs involved in respiration, in a biological sample, in which said biological sample is constituted by cells in suspension.

In a particular embodiment, the present invention also concerns the in vitro use of at least one lectin recognizing the fucose α 1-2 galactose β 1-4 N-acetylglucosamine group for the labelling of cancer stem cells of organs involved in respiration, to obtain labelled cancer stem cells of organs involved in respiration, in a biological sample, in which said biological sample is constituted by cells in suspension.

In a particular embodiment, said at least one lectin is chosen from the UEA-1 lectins or its homologue TJA-II, ABA, ACA, jacaline, GSL-I and GSL-II.

Thus, the present invention concerns the in vitro use of at least one lectin chosen from the lectins UEA-1 or its homologue TJA-II, ABA, ACA, ACA, jacaline, GSL-I and GSL-II for the labelling of cancer stem cells of organs involved in respiration, to obtain labelled cancer stem cells of organs involved in respiration, in a biological sample, in which said biological sample is constituted by cells in suspension.

According to another embodiment, the present invention concerns the in vitro use of at least one lectin recognizing the fucose α 1-2 galactose group for the labelling of cancer stem cells of organs involved in respiration, to obtain labelled cancer stem cells of organs involved in respiration, in a biological sample, in which said biological sample is constituted by a cellular tissue.

In a particular embodiment, the present invention also concerns the in vitro use of at least one lectin recognizing the fucose α 1-2 galactose β 1-4 N-acetylglucosamine group for the labelling of cancer stem cells of organs involved in respiration, to obtain labelled cancer stem cells of organs involved in respiration, in a biological sample, in which said biological sample is constituted by a cellular tissue.

In a particular embodiment, said at least one lectin is chosen from the UEA-1 lectins or its homologue TJA-II, ABA, ACA, jacaline, GSL-I and GSL-II.

Thus, the present invention concerns the in vitro use of at least one lectin chosen from the lectins UEA-1 or its homologue TJA-II, ABA, ACA, ACA, jacaline, GSL-I and GSL-II, for the labelling of cancer stem cells of organs involved in respiration, to obtain labelled cancer stem cells of organs involved in respiratio, in a biological sample, in which said biological sample is constituted by a cellular tissue.

According to one embodiment, the present invention concerns the in vitro use, as described above, of at least two lectins, said at least two lectins being in equimolar quantity.

According to one embodiment, the present invention concerns the in vitro use of at least two lectins chosen from the lectins UEA-1 or its homologue TJA-II, ABA, ACA, jacaline, GSL-I and GSL-II, said at least two lectins being in equimolar quantity.

According to one embodiment, the present invention concerns the in vitro use of a mixture of two lectins chosen from the lectins UEA-1 or its homologue TJA-II, ABA, ACA, jacaline, GSL-I and GSL-II, said two lectins being in equimolar quantity in said mixture.

By equimolar quantity, it means that each of the two lectins is used in the same quantity as the other. This is a weight ratio of 1:1 between the two lectins.

Thus, in one embodiment, the present invention concerns the in vitro use of a mixture of two lectins chosen from the following mixtures: (UEA-1, ABA), (UEA-1, ABA), (UEA-1, ACA), (UEA-1, GSL-I), (UEA-1, GSL-II), (ABA, ACA), (ABA, Jacaline), (ABA, GSL-I), (ABA, GSL-II), (ACA, Jacaline), (ACA, GSL-II), (ACA, GSL-I), (Jacaline, GSL-II), (GSL-I, GSL-II), (TJA-II, ABA), (TJA-II, ACA), (TJA-II, Jacaline), (TJA-II, GSL-I), (TJA-II, GSL-II), said two lectins being in equimolar quantity in said mixture.

According to one embodiment, the present invention concerns the in vitro use of two lectins, said two lectins being a mixture (GSL-I, GSL-II), in which each of the lectins are in equimolar quantity.

According to one embodiment, the present invention concerns the in vitro use of two lectins, said two lectins being a mixture (UEA-1, GSL-I), in which each of the lectins are in equimolar quantity.

According to one embodiment, the present invention concerns the in vitro use, as described above, of at least two lectins, said at least two lectins being in non-equimolar quantity.

According to one embodiment, the present invention concerns the in vitro use of at least two lectins chosen from the lectins UEA-1 or its homologous TJA-II, ABA, ACA, jacaline, GSL-I and GSL-II, said at least two lectins being in non-equimolar quantity.

According to a method of realization, the present invention concerns the in vitro use of a mixture of two lectins chosen from the lectins UEA-1 or its homologue TJA-II, ABA, ACA, jacaline, GSL-I and GSL-II said two lectins being in non-equimolar quantity in said mixture.

By non-equimolar quantity, it means that each of the lectins is present in a different quantity compared to the other. In particular, it is a weight ratio of 2:1, 3:1 or 4:1 between the two lectins.

Thus, in one embodiment, the present invention concerns the in vitro use of a mixture of two lectins chosen from the following mixtures: (UEA-1, ABA), (ABA, UEA-1), (UEA-1, ACA), (ACA, UEA-1), (UEA-1, Jacaline), (Jacaline, UEA-1, GSL-I), (GSL-I, UEA-1), (UEA-1, GSL-II), (GSL-II, UEA-1), (ABA, ACA, ABA), (ABA), Jacaline), (Jacaline, ABA), (ABA, GSL-I), (GSL-I, ABA), (ABA, GSL-II, GSL-II), (GSL-II, ABA), (ACA, Jacaline, ABA), (ACA, GSL-I), (GSL-I, ACA), (ACA, GSL-II), (GSL-II, CA), (Jacaline, GSL-I), (GSL-I, Jacaline), (Jacaline, GSL-II, (GSL-II, Jacaline), (GSL-I, GSL-II, GSL-II), (GSL-II, GSL-I), (TJA-II, ABA), (ABA, TJA-II), (TJA-II, ACA), (ACA, TJA-II), (TJA-II, Jacaline), (Jacaline, TJA-II), (TJA-II, GSL-I), (GSL-I, TJA-II), (TJA-II, GSL-II), (GSL-II, TJA-II), said two lectins being in a non-equimolar quantity in said mixture, in particular in a weight ratio of 2:1, 3:1 or 4:1, more particularly 2:1.

According to a particular embodiment, the present invention concerns the in vitro use of two lectins, said two lectins being a mixture (UEA-1, GSL-I), in which the lectins are in non-equimolar quantity in a weight ratio of 2:1, that is 2 UEA-1 for 1 GSL-I.

According to a particular embodiment, the present invention concerns the in vitro use of two lectins, said two lectins being a mixture (UEA-1, GSL-I), in which the lectins are in non-equimolar quantity in a weight ratio of 3:1, that is 3 UEA-1 for 1 GSL-I.

According to a particular embodiment, the present invention concerns the in vitro use of two lectins, said two lectins being a mixture (UEA-1, GSL-I), in which the lectins are in non-equimolar quantity in a weight ratio of 4:1, that is 4 UEA-1 for 1 GSL-I.

According to one embodiment, the present invention concerns the in vitro use of at least three lectins chosen from the lectins UEA-1 or its homologue TJA-II, ABA, ACA, jacaline, GSL-I and GSL-II, said at least three lectins being in equimolar quantity.

According to one embodiment, the present invention concerns the in vitro use of a mixture of three lectins chosen from the lectins UEA-1 or its homologue TJA-II, ABA, ACA, jacaline, GSL-I and GSL-II, said three lectins each being in equimolar quantity in said mixture.

By equimolar quantity, it means that each of the three lectins is used in the same quantity as the others. This is a weight ratio of 1:1:1 between the three lectins.

Thus, according to one embodiment, the present invention concerns the in vitro use of a mixture of three lectins, chosen from the following mixtures: (UEA-1, ABA, ACA), (UEA-1, ABA, Jacaline), (UEA-1, ABA, GSL-I), (UEA-1, ABA, GSL-II), (UEA-1, ACA, Jacaline), (UEA-1, ACA, GSL-I), (UEA-1, ACA, GSL-II), (UEA-1, Jacaline, GSL-I), (UEA-1, Jacaline, GSL-II), (UEA-1, GSL-I, GSL-II), (ABA, ABA, ACA, Jacaline), GSL-II), (UEA-1, GSL-I, GSL-II), (ABA, ABA, ACA, Jacaline), (ABA, ACA, GSL-I), (ABA, ACA, GSL-II), (ABA, Jacaline, GSL-I), (ABA, Jacaline, GSL-II), (ABA, GSL-I, GSL-II), (ABA, GSL-II), (ACA, Jacaline, GSL-II), (ACA, GSL-I, GSL-II), (Jacaline, GSL-I, GSL-II), (TJA-II, ABA, ABA, ACA), (TJA-II, ABA, Jacaline), (TJA-II, ABA, GSL-I), (TJA-II, ABA, GSL-II), (TJA-II, TJA-II, GSL-II), (ACA, ACA, Jacaline), ACA, GSL-I), (TJA-II, ACA, ACA, GSL-II), (TJA-II, Jacaline, GSL-I), (TJA-II, Jacaline, GSL-II), (TJA-II, GSL-I, GSL-II), said three lectins being in equimolar quantity in said mixture.

According to one embodiment, the present invention concerns the in vitro use, as previously described, of three lectins, said three lectins being chosen from a mixture of UEA-1 or its homologue TJA-II, jacaline and ABA, or a mixture of UEA-1 or its homologue TJA-II, jacaline and ACA, and said three lectins being each present in the mixture in equimolar quantity.

According to one embodiment, the present invention concerns the in vitro use of at least three lectins chosen from the lectins UEA-1 or its homologue TJA-II, ABA, ACA, jacaline, GSL-I and GSL-II, said at least three lectins being in non-equimolar quantity.

According to one embodiment, the present invention concerns the in vitro use of a mixture of three lectins chosen from the lectins UEA-1 or its homologue TJA-II, ABA, ACA, jacaline, GSL-I and GSL-II, said three lectins being in non-equimolar quantity in said mixture.

In the case of the use of three lectins, by non-equimolar quantity, it means that the three lectins are not used in equimolar quantity with respect to each other, and that at least two of the three lectins are used in different quantities. In particular, it is a weight ratio of 2:1:1 between the three lectins.

Thus, according to a particular embodiment, the present invention concerns the in vitro use of a mixture of three lectins chosen from the following mixtures: (UEA-1, ABA, ACA), (UEA-1, ABA, Jacaline), (UEA-1, ABA, GSL-I), (UEA-1, ABA, GSL-II), (UEA-1, ACA, Jacaline), (UEA-1, ACA, GSL-I), (UEA-1, ACA, GSL-II), (UEA-1, Jacaline, GSL-I), (UEA-1, GSL-I, GSL-II), (ABA, ACA, ACA, Jacaline), (ABA, ACA, ACA, GSL-I), (ABA, ACA, GSL-II), (ABA, Jacaline, GSL-I), (ABA, Jacaline, GSL-II), (ABA, GSL-I, GSL-II), (ACA, Jacaline, GSL-II), (ACA, GSL-I, GSL-II), (Jacaline, GSL-I, GSL-II), (TJA-II, ABA, ACA), (TJA-II, ABA, Jacaline), (TJA-II, ABA, GSL-I), (TJA-II, ABA, ABA, GSL-II), (TJA-II, ACA, Jacaline), (TJA-II, ACA, GSL-I), (TJA-II, ACA, GSL-II), (TJA-II, Jacaline, GSL-I), (TJA-II, Jacaline, GSL-II), (TJA-II, GSL-I, GSL-II), said three lectins being in a non-equimolar quantity in said mixture, in particular in a weight ratio of 2:1:1, 1:2:1 or 1:1:2.

The present invention also concerns an in vitro labelling method of cancer stem cells of organs involved in respiration, comprising a step of labelling cancer stem cells of organs involved in respiration with at least one lectin recognizing the fucose α 1-2 galactose group, to obtain labelled cancer stem cells of organs involved in respiration, in a biological sample.

In a particular embodiment, the present invention also concerns an in vitro labelling method of cancer stem cells of organs involved in respiration, comprising a step of labelling cancer stem cells of organs involved in respiration with at least one lectin recognizing the fucose α 1-2 galactose β 1-4 N-acetylglucosamine group, to obtain labelled cancer stem cells of organs involved in respiration, in a biological sample.

In a particular embodiment, said at least one lectin is chosen from the lectins UEA-1 or its homologue TJA-II, ABA, ACA, jacaline, GSL-I and GSL-II.

Thus, the present invention also concerns an in vitro labelling method of cancer stem cells of organs involved in respiration, comprising a step of labelling the cancer stem cells of organs involved in respiration with at least one lectin selected from the lectins UEA-1 or its homologue TJA-II, ABA, ACA, jacaline, GSL-I and GSL-II, to obtain labelled cancer stem cells of organs involved in respiration, in a biological sample.

This labelling method can be integrated into a method for detecting cancer stem cells of organs involved in respiration using a lectin conjugated to a label selected from a fluorophore, radioisotope, enzyme, biotin or gold beads.

This invention also concerns an in vitro method for the detection of cancer stem cells of organs involved in respiration in a biological sample, comprising:
 (a) a step of labelling the cancer stem cells of organs involved in respiration with at least one lectin recognizing the fucose α 1-2 galactose group, said lectin being conjugated to a label selected from: a fluorophore, a radioisotope, an enzyme, gold beads or biotin, to obtain a biological sample in which the cancer stem cells of organs involved in respiration are marked with at least one lectin, followed by (b) a step of detecting said cancer stem cells of organs involved in respiration labelled with at least one lectin.

In a particular embodiment, the said fucose α 1-2 galactose group recognized by the lectins of the invention is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

Thus, in a particular embodiment, the invention concerns an in vitro method of detection as described above, in which the at least one lectin is chosen from the lectins UEA-1 or its homologue TJA-II, ABA, ACA, jacaline, GSL-I and GSL-II, in particular at least two lectins chosen from UEA-1 or its homologue TJA-II, ABA, ACA, jacaline, GSL-I and GSL-II, in particular the mixture of GSL-I and GSL-II or the mixture UEA-1 and GSL-I, in particular at least three lectins selected from UEA-1 or its homologue TJA-II, ABA, ACA, jacaline, GSL-I and GSL-II, in particular the mixture of UEA-1, jacaline and ABA, or the mixture of UEA-1, jacaline and ACA.

In a particular embodiment, the invention concerns an in vitro detection method as described above, in which at least two lectins are used, said at least two lectins being in equimolar quantity.

In a particular embodiment, the invention concerns an in vitro method of detection as described above, in which at least two lectins are used, said at least two lectins being in non-equimolar quantity In a particular embodiment, the invention concerns an in vitro method of detection as described above, in which two lectins are used, said 2 lectins being UEA-1 and GSL-I in a non-equimolar quantity in a weight ratio of 2:1, 3:1 or 4:1.

In a particular embodiment, the invention concerns an in vitro method of detection as described above, in which said biological sample is a biological sample of organs involved in respiration.

In a particular embodiment, the invention concerns an in vitro method of detection as described above, in which said organ involved in respiration is chosen from the lungs, larynx, pharynx, mouth, nose, throat, tongue, sinuses, trachea and salivary glands (tonsils and parotid glands).

In a particular embodiment, the invention concerns the in vitro method of detecting lung cancer stem cells in a biological sample, comprising:

(a) a step of labelling lung cancer stem cells with at least one lectin recognizing the fucose α 1-2 galactose group, selected from lectins UEA-1, ABA, ACA, jacaline, GSL-I and GSL-II, said lectin being conjugated to a label selected from: a fluorophore, a radioisotope, an enzyme, gold beads or biotin, to obtain a biological sample in which the lung cancer stem cells are labelled with at least one lectin, followed by (b) a step of detecting said lung cancer stem cells labelled with at least one lectin.

In one embodiment of the method where lectin is conjugated to a fluorophore, cancer stem cells of organs involved in respiration are detected by fluorescence microscopy or fluorescence reader.

In one embodiment of the method where lectin is conjugated to a radioisotope, cancer stem cells of organs involved in respiration are detected by a gamma camera.

In one embodiment of the method where lectin is conjugated to an enzyme catalyzing the formation of a coloured product such as horseradish peroxidase (HRP), alkaline phosphatase, glucose oxidase or β-galactosidase, labelled cancer stem cells of organs involved in respiration are detected by UV/visible microscopy or absorbance reader following the addition of a chromogenic substrate.

In one embodiment of the method where lectin is conjugated to an enzyme catalyzing the formation of a luminescent product such as HRP, labelled cancer stem cells of organs involved in respiration are detected by luminescence microscopy or by a luminescence reader, following the addition of a chemiluminescent substrate such as luminol.

In one embodiment of the method where lectin is conjugated to gold beads, labelled cancer stem cells of organs involved in respiration are detected by electron microscopy.

In one embodiment of the method where lectin is conjugated with biotin, said cancer stem cells of organs involved in respiration are detected by one of the detection modes described above in which said label is conjugated to streptavidin or avidin.

The labelling method can also be integrated into a method for isolating cancer stem cells of organs involved in respiration using a lectin conjugated to a label selected from a fluorophore, a radioisotope, an enzyme, biotin or gold beads.

In one embodiment, the method according to this invention makes it possible to isolate cancer stem cells of organs involved in respiration. This isolation step allows in particular to study cancer stem cells of organs involved in respiration detected in a tumour sample of organs involved in respiration in order, for example, to discover new treatments capable of eliminating these cancer stem cells, which frequently cause recurrences and metastases.

By "in vitro isolation method" it means that the biological sample is enriched with cancer stem cells (CSCs) of organs involved in respiration by depletion of cancer non-stem cells (CNSCs) of organs involved in respiration.

Cancer stem cells of organs involved in respiration are specifically separated from other cell types present in the sample, such as possibly cancer non-stem cells of organs involved in respiration (CNSCs), by the use of at least one lectin recognizing the fucose α 1-2 galactose group.

In a particular embodiment, cancer stem cells of organs involved in respiration are specifically separated from other cell types present in the sample, such as possibly cancer non-stem cells of organs involved in respiration (CNSCs), by the use of at least one lectin recognizing the fucose α 1-2 galactose β 1-4 N-acetylglucosamine group.

In a particular embodiment, cancer stem cells of organs involved in respiration are specifically separated from other cell types present in the sample, such as possibly cancer non-stem cells of organs involved in respiration (CNSCs), by the use of at least one lectin selected from the lectins UEA-1 or its homologue TJA-II, ABA, ACA, jacaline, GSL-I and GSL-II.

This enrichment of the sample with CSCs makes it possible to obtain a biological sample in which cancer stem cells of organs involved in respiration are predominantly represented, i.e. they are present in greater quantities than other cell types, particularly compared to CNSCs.

Thus, the present invention also concerns an in vitro method for isolating cancer stem cells of organs involved in respiration in a biological sample comprising:

(a) a step of labelling the cancer stem cells of organs involved in respiration with at least one lectin recognizing the fucose α 1-2 galactose group, said lectin being conjugated to biotin or a fluorophore, to obtain a biological sample in which the cancer stem cells of organs involved in respiration are labelled with at least one lectin, followed by (b) a step of isolating said cancer stem cells of organs involved in respiration labelled with at least one lectin.

In a particular embodiment, the said fucose α 1-2 galactose group recognized by the lectins of the invention is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

In a particular embodiment, this invention concerns an in vitro method for isolating cancer stem cells of organs involved in respiration in a sample comprising:

(a) a step of labelling cancer stem cells of organs involved in respiration with at least one lectin recognizing the fucose α 1-2 galactose group, said lectin being conjugated to biotin, to obtain a biological sample in which the cancer stem cells of organs involved in respiration are labelled with at least one lectin, followed by (b) a step of isolating said cancer stem cells of organs involved in respiration labelled with at least one lectin, via a support with streptavidin or avidin.

In a particular embodiment, the said fucose α 1-2 galactose group recognized by the lectins of the invention is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

This isolation may be followed by the recovery of the sample enriched with cancer stem cells, by removal of the supernatant, and then by eluting the cancer stem cells linked to the said support.

The said elution can be carried out under acidic conditions to break the streptavidine/avidin-biotin bond.

According to one embodiment, said support consists of magnetic beads functionalized with streptavidin or avidin and said isolation step is carried out by magnetic sorting in the presence of a magnet.

In the particular case where said support consists of magnetic beads and the streptavidin or avidin is bound to the magnetic beads by a DNA bond, said elution is achieved by DNAse treatment.

In a particular embodiment, this invention concerns an in vitro method for isolating cancer stem cells of organs involved in respiration in a biological sample comprising:

(a) a step of labelling the cancer stem cells of organs involved in respiration with at least one lectin recognizing the fucose α 1-2 galactose group, said lectin being conjugated to a fluorophore to obtain a biological sample in which the cancer stem cells of organs involved in respiration are labelled with at least one lectin, followed by (b) a step of isolating said cancer stem cells of organs involved in respiration labelled with at least one lectin by cell sorting in flow cytometry.

In a particular embodiment, the said fucose α 1-2 galactose group recognized by the lectins of the invention is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

In a particular embodiment, the present invention also concerns an in vitro isolation method as described above, in which the said at least one lectin is chosen from the lectins UEA-1 or its homologue TJA-II, ABA, ACA, jacaline, GSL-I and GSL-II, in particular at least two lectins chosen from UEA-1 or its homologue TJA-II, ABA, ACA, jacaline, GSL-I and GSL-II, in particular the mixture of GSL-I and GSL-II or the mixture UEA-1 and GSL-I, in particular at least three lectins chosen from UEA-1 or its homologue TJA-II, ABA, ACA, jacaline, GSL-I and GSL-II, in particular the mixture of UEA-1, jacaline and ABA, or the mixture of UEA-1, jacaline and ACA.

In a particular embodiment, the present invention also concerns an in vitro isolation method as described above, in which at least two lectins are used, said at least two lectins being in equal or unequal quantity In a particular embodiment, the present invention also concerns an in vitro isolation method as described above, in which at least two lectins are used, said at least two lectins being in non-equimolar quantity.

In a particular embodiment, the present invention also concerns an in vitro isolation method as described above, in which two lectins are used, said 2 lectins being UEA-1 and GSL-I in a non-equimolar quantity in a weight ratio of 2:1, 3:1 or 4:1

In a particular embodiment, this invention also concerns an in vitro isolation method as described above, in which said biological sample is a biological sample of organs involved in respiration.

In a particular embodiment, this invention also concerns an in vitro isolation method as described above, in which said organ involved in respiration is chosen from the lungs, larynx, pharynx, mouth, nose, throat, tongue, sinuses, trachea and salivary glands (tonsils and parotid glands).

In a particular embodiment, the invention concerns an in vitro method for isolating lung cancer stem cells in a biological sample comprising:

(a) a step of labelling lung cancer stem cells with at least one lectin recognizing the fucose α 1-2 galactose group, the lectins UEA-1, ABA, ACA, ACA, jacaline, GSL-I and GSL-II, said lectin being conjugated to biotin or a fluorophore, to obtain a biological sample in which the lung cancer stem cells are labelled with at least one lectin, followed by (b) a step of isolating said lung cancer stem cells labelled with at least one lectin, said isolation step being carried out via a support functionalized with streptavidin or avidin constituted by magnetic beads and in the presence of a magnet, when said lectin is conjugated to biotin, and said isolation step being carried out by cell sorting in flow cytometry, when said lectin is conjugated to a fluorophore.

Flow cytometric cell sorting thus makes it possible to obtain a fraction of the sample enriched with cancer stem cells.

Before the cancer stem cells of organs involved in respiration are labelled in step (a), the cells in the sample are advantageously dissociated from each other. This cell dissociation can be carried out by conventional procedures, for example by using one or more enzymes capable of separating cells from each other without altering the glycans expressed on the cell surface, in particular the fucose α 1-2 galactose group, more particularly the fucose α 1-2 galactose β 1-4 N-acetylglucosamine group. For example, cell dissociation can be implemented with the Liberase® mixture marketed by Roche Diagnostic.

The present invention therefore also concerns methods according to the invention, comprising a preliminary step of dissociation of the cells of the sample from each other before the labelling step.

The study of cancer stem cells for research and diagnostic purposes is nowadays a necessity, in particular to identify new substances capable of being effective against these cells. The study of these cells is also particularly useful in the context of personalized medicine.

Cancer stem cells of organs involved in respiration are a specific population cells that, because of their resistance to chemotherapy treatments, lead to tumor reappearance and tumor recurrence. The present invention therefore makes it possible, through the detection or isolation of cancer stem cells of organs involved in respiration, to evaluate the risk of recurrence of cancer of organs involved in respiration.

The detection of cancer stem cells of organs involved in respiration, possibly followed by their quantification, makes it possible to assess the risks of tumour progression.

The present invention therefore also concerns the use of a lectin recognizing the fucose α 1-2 galactose group, more particularly the fucose α 1-2 galactose β 1-4 N-acetylglucosamine group for the in vitro diagnosis of the risk of recurrence and/or of aggressiveness of a cancer of organs involved in respiration to define a prognostic value for the therapeutic adaptation of a cancer of organs involved in respiration.

Thus, the present invention also concerns a method for the in vitro diagnosis of the risk of recurrence of cancer of organs involved in respiration and/or aggressiveness of cancer of organs involved in respiration to define a prognostic value for the therapeutic adaptation of a cancer of organs involved in respiration, comprising a step of labelling the cancer stem cells of organs involved in the respiration of a biological sample of organs involved in respiration with at least one lectin recognizing the fucose α 1-2 galactose group, to obtain cancer stem cells of organs involved in respiration labelled by at least one lectin in said sample.

In a particular embodiment, this invention also concerns a method for the in vitro diagnosis of the risk of recurrence of cancer of organs involved in respiration and/or aggressiveness of cancer of organs involved in respiration to define a prognostic value for the therapeutic adaptation of a cancer of organs involved in respiration, comprising a step of labelling the cancer stem cells of organs involved in respiration of a biological sample of organs involved in respiration with at least one lectin recognizing the fucose α 1-2 galactose β 1-4 N-acetylglucosamine group, to obtain cancer stem cells of organs involved in respiration labelled by at least one lectin in said sample.

Thus, the present invention also concerns a method for the in vitro diagnosis of the risk of recurrence of cancer of organs involved in respiration and/or aggressiveness of cancer of organs involved in respiration to define a prognostic value for the therapeutic adaptation of a cancer of organs involved in respiration, comprising a step of labelling the cancer stem cells of organs involved in the respiration of a biological sample of organs involved in respiration with at least one lectin selected from lectins UEA-1 or its homologue TJA-II, ABA, ACA, jacaline, GSL-I and GSL-II, to obtain cancer stem cells of organs involved in respiration labelled by at least one lectin in said sample.

According to a particular embodiment, the diagnostic method of the invention includes the steps of:

(a) Labelling the cancer stem cells of organs involved in respiration with at least one lectin recognizing the fucose α 1-2 galactose group, to obtain cancer stem cells of organs involved in respiration labelled with at least one lectin, in said biological sample, said lectin being conjugated to a label selected from a fluorophore, a radioisotope, an enzyme, gold beads or biotin, (b) Detection of said cancer stem cells of organs involved in respiration labelled by fluorescence microscopy or fluorescence reader when lectin is conjugated to a fluorophore or when lectin is conjugated to biotin and is detected via a fluorophore conjugated to streptavidin or avidin;

luminescence microscopy or luminescence reader when lectin is conjugated to an enzyme using a chemiluminescent substrate or when lectin is conjugated to biotin and is detected via an enzyme using a chemiluminescent substrate conjugated to streptavidin or avidin;

gamma camera when lectin is conjugated to a radioisotope, or when lectin is conjugated to biotin and is detected via a radioisotope conjugated to streptavidin or avidin;

UV/visible microscopy or absorbance reader when the lectin is conjugated to an enzyme using a chromogenic substrate, or when the lectin is conjugated to biotin and is detected via an enzyme using a chromogenic substrate conjugated to streptavidin or avidin;

electron microscopy when lectin is conjugated to gold beads, or when lectin is conjugated to biotin and is detected via gold beads conjugated to streptavidin or avidin;

(c) Possibly quantification of cancer stem cells of organs involved in respiration;

(d) Comparison of the intensity of detection of cancer stem cells of organs involved in respiration in said biological sample with the intensity of detection of cancer stem cells of organs involved in respiration in a healthy sample adjacent to the biological sample, and optionally comparison of the quantification of cancer stem cells of organs involved in respiration in said biological sample with the quantification of cancer stem cells of organs involved in respiration in a healthy sample adjacent to the biological sample (e) Deduction of the risk of recurrence of cancer of organs involved in respiration and/or aggressiveness of cancer of organs involved in respiration to define a prognostic value for the therapeutic adaptation of cancer of organs involved in respiration from the presence and possibly the quantity of cancer stem cells of organs involved in respiration.

In a particular embodiment, the said fucose α 1-2 galactose group recognized by lectins is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

According to a particular embodiment, the diagnostic method of the invention comprises the steps of:
(a) Labelling the cancer stem cells of organs involved in respiration with at least one lectin recognizing the fucose α 1-2 galactose group, to obtain cancer stem cells of organs involved in respiration labelled with at least one lectin in said biological sample,
said lectin being conjugated to a label selected from a fluorophore or biotin,
(b) Isolation of cancer stem cells of organs involved in respiration labelled by at least one conjugated lectin:
when labelling with a lectin conjugated to biotin, said isolation is carried out via a support functionalized with streptavidin or avidin, in particular said functionalized support consists of magnetic beads functionalized with streptavidin or avidin and said isolation is carried out by magnetic cell sorting in the presence of a magnet, or
when labelled with a lectin conjugated to a fluorophore, said isolation is carried out by cell sorting in flow cytometry.
(c) New labelling of cancer stem cells of organs involved in respiration isolated with at least one lectin recognizing the fucose α 1-2 galactose group, to obtain cancer stem cells of organs involved in respiration isolated and labelled by the new labelling,
said lectin being conjugated to a label selected from a fluorophore, a radioisotope, an enzyme, gold beads or biotin,
(d) Detection of said cancer stem cells of organs involved in respiration isolated and labelled by the new labelling by
fluorescence microscopy or fluorescence reader when lectin is conjugated to a fluorophore or when lectin is conjugated to biotin and is detected via a fluorophore conjugated to streptavidin or avidin;
luminescence microscopy or luminescence reader when lectin is conjugated to an enzyme using a chemiluminescent substrate or when lectin is conjugated to biotin and is detected via an enzyme using a chemiluminescent substrate conjugated to streptavidin or avidin;
gamma camera when lectin is conjugated to a radioisotope, or when lectin is conjugated to biotin and is detected via a radioisotope conjugated to streptavidin or avidin;
UV/visible microscopy or absorbance reader when the lectin is conjugated to an enzyme using a chromogenic substrate, or when the lectin is conjugated to biotin and is detected via an enzyme using a chromogenic substrate conjugated to streptavidin or avidin;
electron microscopy when lectin is conjugated to gold beads, or when lectin is conjugated to biotin and is detected via gold beads conjugated to streptavidin or avidin;
(e) Possibly quantification of cancer stem cells of organs involved in respiration;
(f) Comparison of the intensity of detection of cancer stem cells of organs involved in respiration in said biological sample with the intensity of detection of cancer stem cells of organs involved in respiration in a healthy sample adjacent to the biological sample,
and optionally comparison of the quantification of cancer stem cells of organs involved in respiration in said biological sample with the quantification of cancer stem cells of organs involved in respiration in a healthy sample adjacent to the biological sample;
(g) Deduction of the risk of recurrence of cancer of organs involved in respiration and/or aggressiveness of cancer of organs involved in respiration to define a prognostic value for the therapeutic adaptation of cancer of organs involved in respiration from the presence and possibly the quantity of cancer stem cells of organs involved in respiration.

In a particular embodiment, the said fucose α 1-2 galactose group recognized by lectins is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

In a particular embodiment, the invention concerns a diagnostic method as described above, in which said at least one lectin is chosen from the lectins UEA-1 or its homologue TJA-II, ABA, ACA, jacaline, GSL-I and GSL-II, in particular at least two lectins chosen from UEA-1 or its homologue TJA-II, ABA, ACA, jacaline, GSL-I and GSL-II, in particular the mixture of GSL-I and GSL-II or the mixture UEA-1 and GSL-I, in particular at least three lectins chosen from UEA-1 or its homologue TJA-II, ABA, ACA, jacaline, GSL-I and GSL-II, in particular the mixture of UEA-1, jacaline and ABA, or the mixture of UEA-1, jacaline and ACA.

In a particular embodiment, the invention concerns a diagnostic method as described above, in which at least two lectins are used, said at least two lectins being in equal or unequal quantity.

In a particular embodiment, the invention concerns a diagnostic method as described above, in which at least two lectins are used, said at least two lectins being in non-equimolar quantity In a particular embodiment, the invention concerns a diagnostic method as described above, in which two lectins are used, said 2 lectins being UEA-1 and GSL-I in a non-equimolar quantity in a weight ratio of 2:1, 3:1 or 4:1

In a particular embodiment, the invention concerns a diagnostic method as described above, in which said biological sample is a biological sample of organs involved in respiration.

In a particular embodiment, the invention concerns a diagnostic method as described above, in which said organ involved in respiration is chosen from the lungs, larynx, pharynx, mouth, nose, throat, tongue, sinuses, trachea and salivary glands (tonsils and parotid gland).

In a particular embodiment, the invention concerns a diagnostic method as described above, in which said cancer is chosen from lung cancer, laryngeal cancer, pharyngeal cancer, oral cancer, nose cancer, throat cancer, tongue cancer, sinus cancer, tracheal cancer and salivary gland cancer (i.e. tonsil cancer and/or parotid gland cancer).

In a particular embodiment, the invention concerns a method for the in vitro diagnosis of the risk of recurrence of pulmonary cancer and/or aggressiveness of pulmonary cancer to define a prognostic value for the therapeutic adaptation of pulmonary cancer, comprising a step of labelling the lung cancer stem cells of a lung biological sample with at least one lectin recognizing the fucose α 1-2 galactose group chosen from lectins UEA-1, ABA, ACA, jacaline, GSL-I and GSL-II, to obtain lung cancer stem cells labelled with at least one lectin in said sample.

The term "pulmonary cancer" refers to lung cancer.

The intensity of detection of cancer stem cells of organs involved in respiration, and possibly their quantification, is compared with respect to a healthy sample adjacent to the biological sample.

The healthy sample adjacent to the biological sample is used as a control.

By "healthy sample adjacent to the biological sample" it means a sample taken from the same individual as the biological sample, but in a tissue close to that in which the biological sample is taken, and which does not have tumour cells in anatomo-pathological analysis and which does not have cancer stem cells by the method according to the invention.

The healthy sample is therefore a sample characterized by the absence of tumour cells in anatomo-pathological analysis and the absence of cancer stem cells by the method according to the invention.

The quantification of cancer stem cells of organs involved in respiration makes it possible to determine the aggressiveness of cancer of organs involved in respiration. This quantification can be established by different methods such as: flow cytometry, western blot, quantitative PCR with generic labels such as Oct-4, cMyc1, Gli-1 or EpCam or a clonogenicity test.

Several of these methods can also be used in parallel to form a beam of CSCs and thus increase the reliability of quantification.

In a particular embodiment, the quantification of cancer stem cells of organs involved in respiration is carried out by a clonogenicity test.

A clonogenicity test consists of culturing the biological sample to observe the ability of cells to reassemble tumor spheres. This property of self-renewal and self-replication is specific to cancer stem cells, so a single cancer stem cell is at the origin of a formed tumor sphere. Thus, the counting of the formed tumour spheres makes it possible to quantify the cancer stem cells in the sample.

These methods, preferably qPCR with generic labels such as Oct-4, c-Myc, Gli-1 or EpCam and the clonogenicity test, also allow the detection of cancer stem cells to determine the presence or absence of these cells after the cancer stem cell isolation step.

These methods are therefore presented as alternatives to the above-mentioned steps (c) and (d), corresponding respectively to the new labelling and the detection of isolated cancer stem cells of organs involved in respiration.

This detection is facilitated and made more reliable by the enrichment of the sample with cancer stem cells.

Detection by these methods also validates the effectiveness of the enrichment of the sample with cancer stem cells of organs involved in respiration by the method according to the invention, i.e. the effectiveness of the method in isolating cancer stem cells of organs involved in respiration.

In the diagnostic methods of the present invention, the higher the intensity of detection in the biological sample is, compared to a healthy sample adjacent to the biological sample, the higher the risk of recurrence of cancer of organs involved in respiration is and more aggressive the cancer is.

Similarly, the higher the quantity of cancer stem cells of organs involved in respiration in the biological sample is, compared to a healthy sample adjacent to the biological sample, the higher the risk of recurrence of cancer of organs involved in respiration is and more aggressive the cancer is.

The detection and quantification of cancer stem cells of organs involved in respiration in a biological sample thus makes it possible to determine the aggressiveness of the cancer of organs involved in respiration and its ability to develop.

The detection and quantification of cancer stem cells of organs involved in respiration is also part of a personalized medical approach. Indeed, the detection of cancer stem cells f organs involved in respiration in the biological sample allowing to assess the prognostic value of the treatment, thus allows the treatment to be adapted.

The present invention also concerns a kit for the in vitro detection of cancer stem cells of organs involved in respiration, in a biological sample, comprising at least one lectin recognizing the fucose α 1-2 galactose group, said lectin being conjugated to a label chosen from: a fluorophore, a radioisotope, an enzyme, gold beads or biotin.

In a particular embodiment, the said fucose α 1-2 galactose group recognized by lectins is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

The present invention also concerns a kit for the in vitro isolation of cancer stem cells of organs involved in respiration in a biological sample, comprising at least one lectin recognizing the fucose α 1-2 galactose group, said lectin being conjugated to biotin, and magnetic beads functionalized with streptavidin.

In a particular embodiment, the said fucose α 1-2 galactose group recognized by lectins is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

The present invention also concerns a kit for the in vitro isolation of cancer stem cells of organs involved in respiration in a biological sample comprising at least one lectin recognizing the fucose α 1-2 galactose group, said lectin being conjugated to a fluorophore.

In a particular embodiment, the said fucose α 1-2 galactose group recognized by lectins is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

This invention also concerns a kit for the in vitro diagnostic of the risk of recurrence of cancer of organs involved in respiration and/or aggressiveness of cancer of organs involved in respiration to define a prognostic value for the therapeutic adaptation of a cancer of organs involved in respiration, comprising:

at least one lectin recognizing the fucose α 1-2 galactose group said lectin being conjugated to biotin, and magnetic beads functionalized with streptavidin, and optionally at least one lectin conjugated to a fluorophore, a radioisotope, an enzyme or gold beads.

In a particular embodiment, the said fucose α 1-2 galactose group recognized by lectins is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

This invention also concerns a kit for the in vitro diagnostic of the risk of recurrence of cancer of organs involved in respiration and/or aggressiveness of cancer of organs involved in respiration to define a prognostic value for the therapeutic adaptation of a cancer of organs involved in respiration, comprising:

at least one lectin recognizing the fucose α 1-2 galactose group, said lectin being conjugated to a fluorophore, and optionally at least one lectin conjugated to biotin, a radioisotope, an enzyme or gold beads.

In a particular embodiment, the said fucose α 1-2 galactose group recognized by lectins is more particularly the fucose α 1-2 galactose β 1-4 N-acetylglucosamine group.

In a particular embodiment, said at least one lectin is chosen from the lectins UEA-1 or its homologue TJA-II, ABA, ACA, jacaline, GSL-I and GSL-II.

Thus, in a particular embodiment, the invention concerns a diagnostic kit as described above, in which the at least one lectin is chosen from the lectins UEA-1 or its homologue TJA-II, ABA, ACA, jacaline, GSL-I and GSL-II, in particular at least two lectins chosen from UEA-1 or its homologue TJA-II, ABA, ACA, jacaline, GSL-I and GSL-II, in particular the mixture of GSL-I and GSL-II or the mixture UEA-1 and GSL-I, in particular at least three lectins chosen from UEA-1 or its homologue TJA-II, ABA, ACA, jacaline, GSL-I and GSL-II, in particular the mixture of UEA-1, jacaline and ABA, or the mixture of UEA-1, jacaline and ACA.

Diagnostics according to the invention are carried out on a biological sample, in particular a sample of organs involved in respiration.

In a particular embodiment, the invention concerns a kit for the in vitro diagnostic of the risk of recurrence of lung cancer and/or aggressiveness of lung cancer to define a prognostic value for the therapeutic adaptation of lung cancer,
comprising at least one lectin recognizing the fucose α 1-2 galactose group chosen from lectins UEA-1, ABA, ACA, ACA, jacaline, GSL-I and GSL-II, said lectin being conjugated to biotin, and magnetic beads functionalized with streptavidin, and optionally at least one lectin chosen from lectins UEA-1, ABA, ACA, jacaline, GSL-I and GSL-II, conjugated with a fluorophore, radioisotope, enzyme or gold beads, or
comprising at least one lectin recognizing the fucose α 1-2 galactose group chosen from lectins UEA-1, ABA, ACA, jacaline, GSL-I and GSL-II, said lectin being conjugated to a fluorophore, and optionally at least one lectin chosen from lectins UEA-1, ABA, ACA, jacaline, GSL-I and GSL-II, conjugated to the biotin, a radioisotope, an enzyme or gold beads.

The kits according to the present invention described above may include at least two conjugated lectins chosen from lectins UEA-1 or its homologue TJA-II, ABA, ACA, jacaline, GSL-I and GSL-II, said at least two conjugated lectins being in equimolar quantity.

According to one embodiment, the kits according to the present invention may include two lectins chosen from the lectins UEA-1 or its homologue TJA-II, ABA, ACA, jacaline, GSL-I and GSL-II, said two lectins being in equimolar quantity.

According to one embodiment, the kits according to the present invention may include two lectins chosen from the following mixtures: (UEA-1, ABA), (UEA-1, ABA), (UEA-1, ACA), (UEA-1, GSL-I), (UEA-1, GSL-II), (ABA, ACA), (ABA, Jacaline), (ABA, GSL-I), (ABA, GSL-II), (ACA, Jacaline), (ACA, GSL-I), (ACA, Jacaline), GSL-I), (Jacaline, GSL-II), (GSL-I, GSL-II), (TJA-II, ABA), (TJA-II, ACA), (TJA-II, Jacaline), (TJA-II, GSL-I), (TJA-II, GSL-II), (GSL-II), said two lectins being in equimolar quantity.

According to one embodiment, the kits according to the present invention may include two lectins, said two lectins being a mixture (GSL-I, GSL-II), in which each of the lectins are in equimolar quantity.

According to one embodiment, the kits according to the present invention may include two lectins, said two lectins being a mixture (UEA-1, GSL-I), in which each of the lectins are in equimolar quantity.

According to one embodiment, the kits according to this invention may include at least two lectins chosen from the lectins UEA-1 or its homologue TJA-II, ABA, ACA, ACA, jacaline, GSL-I and GSL-II, said at least two lectins being in non-equimolar quantity.

According to one embodiment, the kits according to the present invention may include two lectins chosen from the lectins UEA-1 or its homologue TJA-II, ABA, ACA, jacaline, GSL-I and GSL-II said two lectins being in non-equimolar quantity.

According to one embodiment, the kits according to the present invention may include two lectins chosen from the following mixtures: (UEA-1, ABA), (ABA, UEA-1), (UEA-1, ACA), (ACA, UEA-1), (UEA-1, Jacaline), (Jacaline, UEA-1, GSL-I), (GSL-I, UEA-1), (UEA-1, GSL-II), (GSL-II, UEA-1), (ABA, ACA, ABA), (ABA), Jacaline), (Jacaline, ABA), (ABA, GSL-I), (GSL-I, ABA), (ABA, GSL-II, ABA), (ACA, Jacaline), (Jacaline, ABA), (ACA, GSL-I), (GSL-I, ACA), (ACA, GSL-II), (GSL-II, CA), (Jacaline, GSL-I), (GSL-I, Jacaline), (Jacaline, GSL-II, GSL-II, Jacaline), (GSL-I, GSL-II), (GSL-II, GSL-I), (TJA-II, ABA), (ABA, TJA-II), (TJA-II, ACA), (ACA, TJA-II), (Jacaline), TJA-II), (TJA-II, GSL-I), (GSL-I, TJA-II), (TJA-II, GSL-II), (GSL-II, TJA-II), said two lectins being in non-equimolar quantity, in particular in a weight ratio of 2:1, 3:1 or 4:1, more particularly 2:1.

According to one embodiment, the kits according to the present invention may comprise two lectins, said two lectins being a mixture (UEA-1, GSL-I), in which the lectins are in non-equimolar quantity in a weight ratio of 2:1, that is 2 UEA-1 for 1 GSL-I.

According to one embodiment, the kits according to the present invention may comprise two lectins, said two lectins being a mixture (UEA-1, GSL-I), in which the lectins are in non-equimolar quantity in a weight ratio of 3:1, that is 3 UEA-1 for 1 GSL-I.

According to one embodiment, the kits according to the present invention may comprise two lectins, said two lectins being a mixture (UEA-1, GSL-I), in which the lectins are in non-equimolar quantity in a weight ratio of 4:1, that is 4 UEA-1 for 1 GSL-I.

The kits according to the present invention described above may include at least three conjugated lectins chosen from the lectins UEA-1 or its homologue TJA-II, ABA, ACA, jacaline, GSL-I and GSL-II, said at least two conjugated lectins being in equimolar quantity.

According to one embodiment, the kits according to the present invention may include three lectins chosen from the lectins UEA-1 or its homologue TJA-II, ABA, ACA, jacaline, GSL-I and GSL-II, said three lectins each being in equimolar quantity.

According to one embodiment, the kits according to the present invention may include three lectins, chosen from the following mixtures: (UEA-1, ABA, ACA), (UEA-1, ABA, Jacaline), (UEA-1, ABA, GSL-I), (UEA-1, ABA, GSL-II), (UEA-1, ACA, Jacaline), (UEA-1, ACA, GSL-I), (UEA-1, ACA, GSL-II), (UEA-1, Jacaline, GSL-II), (UEA-1), Jacaline, GSL-II), (UEA-1, GSL-I, GSL-II), (ABA, ACA, ACA, Jacaline), (ABA, ACA, ACA, GSL-I), (ABA, ACA, ACA, GSL-II), (ABA, Jacaline, GSL-I), (ABA, Jacaline, GSL-II), (ABA, GSL-I, GSL-II), (ABA, GSL-II), (ACA, Jacaline, GSL-II), GSL-I), (ACA, Jacaline, GSL-II), (ACA, GSL-I, GSL-II), (Jacaline, GSL-I, GSL-II), (TJA-II, ABA, ABA, ACA), (TJA-II, ABA, Jacaline), (TJA-II, ABA, GSL-I), (TJA-II, ABA, GSL-II), (TJA-II, ACA, Jacaline), (TJA-II, ACA, GSL-I), (TJA-II, ACA, GSL-II), (TJA-II, Jacaline, GSL-I), (TJA-II, Jacaline, GSL-II), (TJA-II, GSL-I, GSL-II), said three lectins being in equimolar quantity.

According to one embodiment, the kits according to the present invention may include three lectins, said three lectins being chosen from a mixture of UEA-1 or its homologue TJA-II, jacaline and ABA, or a mixture of UEA-1 or its homologue TJA-II, jacaline and ACA, and said three lectins being each present in the mixture in equimolar quantity.

According to one embodiment, the kits according to the present invention may include at least three lectins chosen from the lectins UEA-1 or its homologue TJA-II, ABA, ACA, ACA, jacaline, GSL-I and GSL-II, said at least three lectins being in non-equimolar quantity.

According to one embodiment, the kits according to the present invention may include three lectins chosen from the lectins UEA-1 or its homologue TJA-II, ABA, ACA, jacaline, GSL-I and GSL-II, said three lectins being in non-equimolar quantity.

According to one embodiment, the kits according to the present invention may include a mixture of three lectins chosen from the following mixtures: (UEA-1, ABA, ACA), (UEA-1, ABA, Jacaline), (UEA-1, ABA, GSL-I), (UEA-1, ABA, GSL-II), (UEA-1, ACA, Jacaline), (UEA-1, ACA, GSL-I), (UEA-1, ACA, GSL-II), (UEA-1, Jacaline, GSL-I), (UEA-1, GSL-I, GSL-II), (ABA, ACA, ACA, Jacaline), (ABA, ACA, ACA, GSL-I), (ABA, ACA, GSL-II), (ABA, Jacaline, GSL-I), (ABA, Jacaline, GSL-II), (ABA, GSL-I, GSL-II), (ACA, Jacaline, GSL-II), (ACA, GSL-I, GSL-II), (Jacaline, GSL-I, GSL-II), (TJA-II, ABA, ACA), (TJA-II, ABA, Jacaline), (TJA-II, ABA, GSL-I), (TJA-II, ABA, GSL-II), (TJA-II, ACA, Jacaline), (TJA-II, ACA, GSL-I), (TJA-II, ACA, GSL-II), (TJA-II, Jacaline, GSL-I), (TJA-II, Jacaline, GSL-II), (TJA-II, GSL-I, GSL-II), said three lectins being in a non-equimolar quantity in said mixture, in particular in a weight ratio of 2:1:1, 1:2:1 or 1:1:2.

In another aspect, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells can be carried out before, after or simultaneously to step (a) of detecting the presence or absence of tumour lesions
c) In case of presence of cancer stem cells of organs involved in respiration and of presence of tumour lesions, a step of administering one or more chemotherapeutic agents for the treatment of cancer of an organ involved in respiration
said administration of one or more chemotherapeutic agents may be combined with radiotherapy and/or targeted therapy It means by "detection of the presence or absence of tumour lesions", any test that detects the presence or absence of tumour lesions. This may include a classical anatomopathological analysis consisting of a HES stain (Hematoxylin Eosin Safran) allowing to define organ structure, a KI-67 protein labelling allowing to determine a cell proliferation index of analysed the tissue or a carcinoembryonic antigen (CEA) labelling, which is a tumour label.

It means by "step of diagnosing the presence or absence of cancer stem cells of organs involved in respiration", a step of implementing the diagnostic method according to the present invention and as defined above.

It means by "targeted therapy", a selective therapy that targets cancer cells by identifying a specific target, such as a receptor, gene or protein. Targeted therapies are generally used as a second or third line of treatment in the event of therapeutic failure. In the case of targeted therapy, the recommended drugs are drugs belonging to the class:
  anti-VEGF, i.e. agents targeting vascular endothelial growth factor
  anti-EGF, i.e. agents targeting epidermal growth factor
  anti-ALKs, i. e. agents targeting the "ALK" kinase (Anaplastic Lymphoma Kinase)

In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells can be performed before, after or simultaneously to step (a) of detecting the presence or absence of tumour lesions
c) In case of presence of cancer stem cells of organs involved in respiration and in case of presence of tumour lesions, a step of administering one or more chemotherapeutic agents for the treatment of cancer of an organ involved in respiration In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells can be performed before, after or simultaneously to step (a) of detecting the presence or absence of tumour lesions
c) In case of presence of cancer stem cells of organs involved in respiration and in case of presence of tumour lesions, a step of administering one or more chemotherapeutic agents for the treatment of cancer of an organ involved in respiration
said administration of one or more chemotherapeutic agents being associated with radiotherapy In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells being carried out after step (a) of detecting the presence or absence of tumour lesions
c) In case of presence of cancer stem cells of organs involved in respiration and in case of presence of tumour lesions, a step of administering one or more chemotherapeutic agents for the treatment of cancer of an organ involved in respiration said administration of one or more chemotherapeutic agents which may be combined with radiotherapy and/or targeted therapy In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells being carried out after step (a) of detecting the presence or absence of tumour lesions
c) In case of presence of cancer stem cells of organs involved in respiration and in case of presence of tumour lesions, a step of administering one or more chemotherapeutic agents for the treatment of cancer of an organ involved in respiration In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells being carried out after step (a) of detecting the presence or absence of tumour lesions
c) In case of presence of cancer stem cells of organs involved in respiration and in case of presence of tumour lesions, a step of administering one or more chemotherapeutic agents for the treatment of cancer of an organ involved in respiration
said administration of one or more chemotherapeutic agents being associated with radiotherapy In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells being carried out simultaneously to step (a) of detecting the presence or absence of tumour lesions
c) In case of presence of cancer stem cells of organs involved in respiration and in case of presence of tumour lesions, a step of administering one or more chemotherapeutic agents for the treatment of cancer of an organ involved in respiration
said administration of one or more chemotherapeutic agents which may be combined with radiotherapy and/or targeted therapy In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells being carried out simultaneously to step (a) of detecting the presence or absence of tumour lesions
c) In case of presence of cancer stem cells of organs involved in respiration and in case of presence of tumour lesions, a step of administering one or more chemotherapeutic agents for the treatment of cancer of an organ involved in respiration In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells being carried out simultaneously to step (a) of detecting the presence or absence of tumour lesions
c) In case of presence of cancer stem cells of organs involved in respiration and in case of presence of tumour lesions, a step of administering one or more chemotherapeutic agents for the treatment of cancer of an organ involved in respiration
said administration of one or more chemotherapeutic agents being associated with radiotherapy According to the present invention, the said chemotherapeutic agent is chosen from vinorelbine (Navelbine™), cisplatin, gemcitabine (Gemzar™), carboplatin, paclitaxel (Taxol™), docetaxel (Taxotère™), permetrexed (Alimta™), erlotinib (Tarceva™), nivolumab, or bevacizumab (Avastin) or a two-by-two combination.

In a particular embodiment, the two chemotherapeutic agents used are: vinorelbine (Navelbine™) and cisplatin, gemcitabine (Gemzar™) and cisplatin, gemcitabine (Gemzar™) and carboplatin, paclitaxel (Taxol™) and cisplatin, paclitaxel (Taxol™) and carboplatin, docetaxel (Taxotère™) and cisplatin, docetaxel (Taxotère™) and carboplatin or permetrexed (Alimta™) and cisplatin.

In another aspect, the invention concerns a method for preventing cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells can be carried out before, after or simultaneously to step (a) of detecting the presence or absence of tumour lesions
c) In case of the presence of cancer stem cells of organs involved in respiration and in case of absence of tumour lesions, a step of setting up of a follow-up of the progression of the cancer stem cells of the organ involved in respiration detected in step a)

It means by "follow-up the evolution of the cancer stem cells of organ involved in respiration", a new implementation of the above-mentioned method of prevention allowing the detection of cancer stem cells of organs involved in respiration or performing a new biopsy accompanied by a new labelling of cancer stem cells of organs involved in respiration using lectins specifically recognizing the fucose α 1-2 galactose group, more particularly the fucose α 1-2 galactose β 1-4 N-acetylglucosamine group according to the present invention. This follow-up will be carried out after the various treatments with chemotherapeutic agents, with radiotherapy and/or with targeted therapy, as described above, in order to observe the regression or not of the presence and/or of the quantity of cancer stem cells of the organ involved in respiration responsible for aggressiveness. This detection will make it possible to orient more precisely the follow-up and/or treatment to be carried out, and this in a personalised way for the patient.

In one embodiment, the present invention concerns a method for preventing cancer of an organ involved in respiration comprising:
  a) A step of detecting the presence or absence of tumor lesions in an organ involved in respiration,
  b) A step of diagnosis of the presence or absence of cancer stem cells of organs involved in respiration
    said step (b) for diagnosing the presence or absence of cancer stem cells being carried out after step (a) of detecting the presence or absence of tumour lesions
  c) In case of the presence of cancer stem cells of organs involved in respiration and in case of absence of tumour lesions, a step of setting up of a follow-up of the progression of the cancer stem cells of the organ involved in respiration detected in step a)

In one embodiment, the present invention concerns a method for preventing cancer of an organ involved in respiration comprising:
  a) A step of detecting the presence or absence of tumor lesions in an organ involved in respiration,
  b) A step of diagnosis of the presence or absence of cancer stem cells of organs involved in respiration
    said step (b) for diagnosing the presence or absence of cancer stem cells being carried out simultaneously to step (a) of detecting the presence or absence of tumour lesions
  c) In case of the presence of cancer stem cells of organs involved in respiration and in case of absence of tumour lesions, a step of setting up of a follow-up of the progression of the cancer stem cells from the organ involved in respiration detected in step a)

In another aspect, the invention concerns a method for treating cancer of an organ involved in respiration comprising:
  a) A step of detecting the presence or absence of tumor lesions in an organ involved in respiration,
  b) A step of diagnosis of the presence or absence of cancer stem cells of organs involved in respiration
    said step (b) for diagnosing the presence or absence of cancer stem cells can be performed before, after or simultaneously to step (a) of detecting the presence or absence of tumour lesions
  c) In case of presence of tumour lesions, a step of administering one or more chemotherapeutic agents for the treatment of cancer of an organ involved in respiration
    said administration of one or more chemotherapeutic agents which may be combined with radiotherapy and/or targeted therapy In one embodiment, the present invention concerns a method for treating cancer of an organ involved in respiration comprising:
  a) A step of detecting the presence or absence of tumor lesions in an organ involved in respiration,
  b) A step of diagnosis of the presence or absence of cancer stem cells of organs involved in respiration
    said step (b) for diagnosing the presence or absence of cancer stem cells can be carried out before, after or simultaneously to step (a) of detecting the presence or absence of tumour lesions
  c) In case of presence of tumour lesions, a step of administering one or more chemotherapeutic agents for the treatment of cancer of an organ involved in respiration In one embodiment, the present invention concerns a method for treating cancer of an organ involved in respiration comprising:
  a) A step of detecting the presence or absence of tumor lesions in an organ involved in respiration,
  b) A step of diagnosis of the presence or absence of cancer stem cells of organs involved in respiration
    said step (b) for diagnosing the presence or absence of cancer stem cells can be carried out before, after or simultaneously to step (a) of detecting the presence or absence of tumour lesions
  c) In case of presence of tumour lesions, a step of administering one or more chemotherapeutic agents for the treatment of cancer of an organ involved in respiration
    said administration of one or more chemotherapeutic agents being associated with radiotherapy In embodiment, the present invention concerns a method for treating cancer of an organ involved in respiration comprising:
  a) A step of detecting the presence or absence of tumor lesions in an organ involved in respiration,
  b) A step of diagnosis of the presence or absence of cancer stem cells of organs involved in respiration
    said step (b) for diagnosing the presence or absence of cancer stem cells being carried out after step (a) of detecting the presence or absence of tumour lesions
  c) In case of presence of tumour lesions, a step of administering one or more chemotherapeutic agents for the treatment of cancer of an organ involved in respiration
    said administration of one or more chemotherapeutic agents which may be combined with radiotherapy and/or targeted therapy In one embodiment, the present invention concerns a method for treating cancer of an organ involved in respiration comprising:
  a) A step of detecting the presence or absence of tumor lesions in an organ involved in respiration,
  b) A step of diagnosis of the presence or absence of cancer stem cells of organs involved in respiration
    said step (b) for diagnosing the presence or absence of cancer stem cells being carried out after step (a) of detecting the presence or absence of tumour lesions
  c) In case of presence of tumour lesions, a step of administering one or more chemotherapeutic agents for the treatment of cancer of an organ involved in respiration In one embodiment, the present invention concerns a method for treating cancer of an organ involved in respiration comprising:
  a) A step of detecting the presence or absence of tumor lesions in an organ involved in respiration,
  b) A step of diagnosis of the presence or absence of cancer stem cells of organs involved in respiration
    said step (b) for diagnosing the presence or absence of cancer stem cells being carried out after step (a) of detecting the presence or absence of tumour lesions
  c) In case of presence of tumour lesions, a step of administering one or more chemotherapeutic agents for the treatment of cancer of an organ involved in respiration
    said administration of one or more chemotherapeutic agents being associated with radiotherapy In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells being carried out simultaneously to step (a) of detecting the presence or absence of tumour lesions
c) In case of presence of tumour lesions, a step of administering one or more chemotherapeutic agents for the treatment of cancer of an organ involved in respiration
said administration of one or more chemotherapeutic agents which may be combined with radiotherapy and/or targeted therapy In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells being carried out simultaneously to step (a) of detecting the presence or absence of tumour lesions
c) In case of presence of tumour lesions, a step of administering one or more chemotherapeutic agents for the treatment of cancer of an organ involved in respiration In one embodiment, the present invention concerns a method for treating cancer of an organ involved in respiration comprising:
a) A step of detecting the presence or absence of tumor lesions in an organ involved in respiration,
b) A step of diagnosis of the presence or absence of cancer stem cells of organs involved in respiration
said step (b) for diagnosing the presence or absence of cancer stem cells being carried out simultaneously to step (a) of detecting the presence or absence of tumour lesions
c) In case of presence of tumour lesions, a step of administering one or more chemotherapeutic agents for the treatment of cancer of an organ involved in respiration
said administration of one or more chemotherapeutic agents being associated with radiotherapy

DESCRIPTION OF THE PREFERRED EMBODIMENTS

Examples

Figure 1:
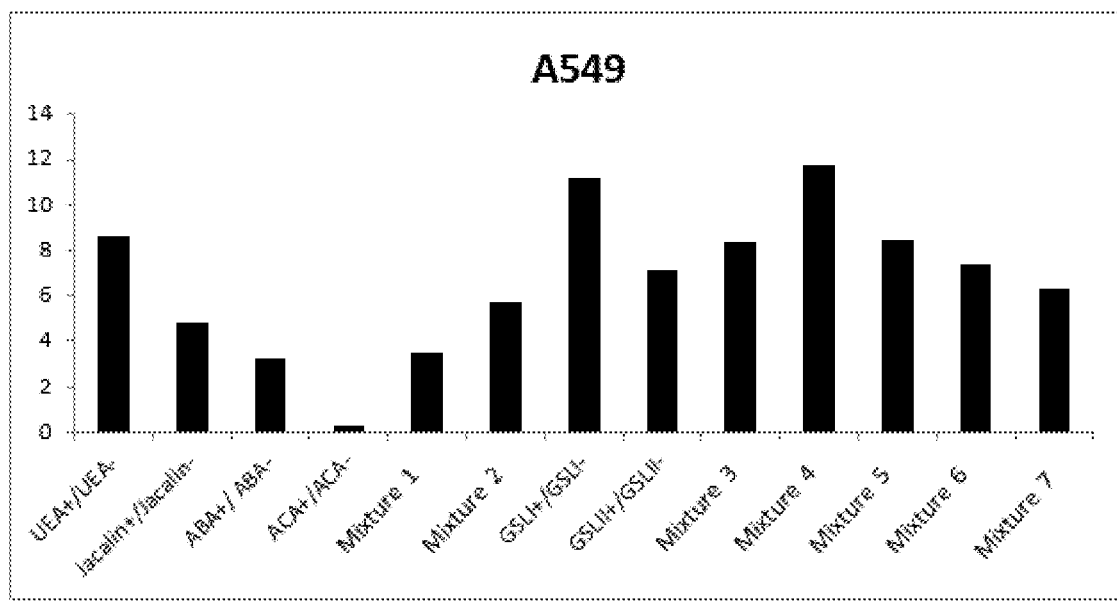
FIG. 1 shows the results of the separation of lung cancer stem cells, leading example of respiratory cancer, on a sample of cells from line A549 and identified using the ratio Epcam High+/Epcam High– following the use of magnetic beads on which streptavidin is grafted and biotinylated UEA-1 (UEA-1 Lectin), biotinylated ABA (ABA Lectin), biotinylated ACA (ACA Lectin), biotinylated Jacaline (Jacaline Lectin), biotinylated GSL-I (GSL-I Lectin), biotinylated GSL-II (GSL-II Lectin), the mixture of biotinylated lectins UEA-1/Jacaline/ABA (Mixture 1: UEA-1, Jacaline, ABA in equimolar quantity), the mixture of biotinylated lectins UEA-1/Jacaline/ACA (Mixture 2: UEA-1, Jacaline, ACA in equimolar quantity), the mixture of biotinylated lectins GSL-I/GSL-II (Mixture 3: GSL-I and GSL-II in equimolar quantity), the mixture of biotinylated lectins UEA-1/GSL-I (Mixture 4: UEA-1 and GSL-I in equimolar quantity), the mixture of biotinylated lectins 2UEA-1/GSL-I (Mixture 5: UEA-1 and GSL-I in a non-equimolar quantity, UEA-1 being in a quantity twice that of GSL-I), the mixture of biotinylated lectins 3UEA-1/GSL-I (Mixture 6: UEA-1 and GSL-I in a non-equimolar quantity, UEA-1 being in a quantity 3 times greater than that of GSL-I) and the mixture of biotinylated lectins 4UEA-1/GSL-I (Mixture 7: UEA-1 and GSL-I in a non-equimolar quantity, UEA-1 being in a quantity 4 times greater than that of GSL-I).

Example 1: Protocol for the Isolation of Pulmonary Cancer Stem Cells, a Key Example of Respiratory Tract Cancers I. Materials Required
Reagents and Equipment
  Individual biotinylated lectin or mixture of biotinylated lectins specifically labelling Pulmonary Cancer Stem Cells (prepared from individual lectins Vector Laboratories)
  Kit CELLection Biotin Binder (Invitrogen) containing magnetic beads coupled to streptavidin by a DNA bound
  Magnet
Buffers
  Versène (Invitrogen) comprising saline phosphate buffer (PBS) and EDTA
  Buffer 1: PBS (Saline phosphate buffer without Ca2+ and Mg2+) with 0.1% BSA (bovine serum albumin), pH 7.4
  Buffer 2: PBS (Phosphate Buffer Saline without Ca2+ and Mg2+) with 0.1% BSA (Bovine Serum Albumin) and 0.6% sodium citrate Buffer 3: RPMI 1640 with 1% FCS (Fetal Calf Serum), 1 mM CaCl2 and 5 mM MgCl2, pH 7.0-7.4.

II. Duration of the Experiment 20 min to prepare the cells
20 min to label the cells
20 min to incubate the labelled cells with the beads
10 min to recover the suspension not enriched in CSCs
15 min to break the CSC/bead connection
5 min to recover the suspension enriched with CSCs of interest
TOTAL: 1h30

III. Magnetic Sorting Operating Mode:

1. Preparation of the cells. The cells of line A549 (immortalized lung cancer line from a lung cancer patient sample) are lifted from their support with a Versene solution for 10 min at 37° C.
2. The cells are counted and the number of cells is adjusted to $1.10^7$ in the sample.
3. The cell suspension is centrifuged at 300 g for 10 min and then the supernatant is removed.
4. Blocking non-specific sites. 1 mL of Buffer 2 is added.
5. Labelling of the cells. A total lectins quantity of 10 µg is added, so that when a plurality of lectins, the quantities of each are identical.

Thus, are added:

10 µg of an individual biotinylated lectin chosen from: UEA-1, ABA, ACA, Jacaline, GSL-I and GSL-II, or
3.33 µg of each lectin for mixture 1 (UEA-1/ABA/Jacaline), or
3.33 µg of each lectin for mixture 2 (UEA-1/ACA/Jacaline) or
5 µg of each lectin for mixture 3 (GSL-I/GSL-II), or
5 µg of each lectin for mixture 4 (UEA-1/GSL-I), or
6.66 µg UEA-1 and 3.33 µg GSL-I for mixture 5, or
7.5 µg UEA-1 and 2.5 µg GSL-I for mixture 6, or
8 µg UEA-1 and 2 µg GSL-1 for the mixture 7
The resulting mixture is incubated for 10 min at 4° C.

6. 500 µL of Buffer 2 is added to wash the cells and the suspension is centrifuged at 300 g for 10 min and the supernatant is removed.
7. Adding beads. The cells are resuspended in 1 mL of Buffer 2 and then 25 µL of magnetic beads coupled to previously washed streptavidin are added and resuspended using Buffer 1. The mixture is incubated for 20 min at 4° C. under gentle agitation.
8. Recovery of the suspension NOT enriched with CSCs. The tube is then placed on the magnet for 2 minutes. The cells labelled with biotinylated lectin and bound to magnetic beads coupled to streptavidin, precipitate towards the magnet (magnetic cell sorting) and are then separated from the unlabeled cells. The supernatant containing the unlabeled cells is then removed by holding the tube placed on the magnet, and is stored in a Falcon tube
9. The tube containing the labelled cancer stem cells is then removed from the magnet, 1 mL of Buffer 1 is added, the tube is vortexed and placed back on the magnet for 2 min before storing the supernatant again in the same falcon as in step 8. This step is repeated twice.
10. The labelled cancer stem cells, still attached to the magnetic beads, are resuspended using 200 µl of Buffer 3 preheated to 37° C. 4 µL of cleavage buffer of cell/bead bond constituted of DNaseI is added. This mixture is incubated for 15 min at room temperature under gentle agitation.
11. The suspension is vigorously shaken with a pipette 5 to 10 times to facilitate cell release.
12. Recovery of the suspension enriched with CSCs. The tube is placed on the magnet for 2 minutes. The magnetic beads are then separated from the labelled cancer stem cells and the supernatant containing the labelled cancer stem cells is transferred into a tube containing 200 µL of buffer 3 preheated at 37° C. Steps 11 and 12 can be repeated again to enhance yield.

These experiments were carried out under similar conditions with each of the individually biotinylated lectins (UEA-1, ABA, ACA, Jacaline, GSL-I, GSL-II), mixtures of two biotinylated lectins (GSL-I/GSL-II=mixture 3; UEA-1/GSL-I=Mixture 4; 2UEA-1/GSL-I=Mixture 5; 3UEA-1/GSL-I=Mixture 6; 4UEA-1/GSL-I=Mixture 7) or three biotinylated lectins (UEA-1/ABA/Jacaline=Mixture 1; UEA-1/ACA/Jacaline=Mixture 2).

The results of these different tests are presented in FIG. 1. It should be noted that the lung example was used to characterize cancer stem cells belonging to the respiratory tract. As the results of these tests show, the use of the mixture UEA1/GSL-I in equimolar quantity allows the isolation of pulmonary cancer stem cells and more broadly of the respiratory tract and this in a predominant way.

Good results are also obtained with lectin GSL II alone and lectin UEA-1 alone and with mixture 3 (consisting of a mixture of lectins GSL-I/GSL-II in equimolar quantity), mixture 5 (consisting of a mixture of lectins UEA-1 and GSL-I in non-equimolar quantity 2:1) and mixture 6 (consisting of a mixture of lectins UEA-1 and GSL-I in non-equimolar quantity 3:1).

Isolation of cancer stem cells from the larynx, pharynx, mouth, nose, throat, tongue, sinuses, trachea and salivary glands (tonsils and/or parotid gland) was also performed according to the protocol described in Example 1. The results obtained are in agreement with those obtained following the isolation of lung cancer stem cells.

Example 2: Clonogenicity Test

The objective of a clonogenicity test is to observe the ability of cells to reassemble spheres (corresponding in the patient to the reassembly of a tumor mass) and therefore their proliferative capacity.

The clonogenicity test is used in this example to confirm the presence of pulmonary cancer stem cells and to quantify said cells in a sample after isolation of pulmonary cancer stem cells by the isolation method described in the present invention. It thus makes it possible to demonstrate the effectiveness of the isolation method according to the invention compared to a control sample not subjected to this method (unsorted cells).

Clonogenicity tests were performed in a 6-well plate at a density of 500 cells/cm² in a DMEM composition medium (Gibco) supplemented with 50 units/mL penicillin, 50 units/mL streptomycin (Gibco) and 2.4 g/L sodium bicarbonate, 1 M HEPES buffer (Sigma Aldrich, Saint-Quentin-Fallavier, France), 1× progesterone (Sigma Aldrich), 1× putrescin (Sigma), 0.025 g/mL heparin (Sigma Aldrich), 30% (m/v) glucose (Sigma Aldrich), 1× growth supplement B27 (Invitrogen, Carlsbad, CA), 20 ng/mL EGF (Sigma Aldrich), 20 ng/mL basic human FGF (Sigma Aldrich), 1× insulin-transferrin sodium selenite supplement (Roche diagnostics, Meylan, France).

Colony evolution was observed after incubation at 37° C. in a $CO_2$ atmosphere for three weeks and quantified with ImageJ® software.

Cancer stem cells from cancers of the organs involved in respiration are isolated from the enrichment method described in the present invention lead to the development of spheres unlike the control. This is a clonogenicity test using unsorted cells (T−) as control, against cells positively sorted by biotinylated UEA-1 (UEA-1 Lectin), biotinylated ABA (ABA Lectin), Biotinylated ACA (ACA Lectin), Biotinylated Jacaline (Jacaline Lectin), Biotinylated GSL-I (GSL-I Lectin), Biotinylated GSL-II (GSL-II Lectin), the mixture of biotinylated Lectin UEA-1/Jacalin/ABA (Mixture 1: UEA-1, Jacaline, ABA in equimolar quantity), the mixture of biotinylated lectins UEA-1/Jacaline/ACA (Mixture 2: UEA-1, Jacaline, ACA in equimolar quantity), and the mixture of biotinylated lectins GSL-I-GSL-II (Mixture 3: GSL-I and GSL-II in equimolar quantity), the mixture of biotinylated lectins UEA-1/GSL-I (Mixture 4: UEA-1 and GSL-I in equimolar quantity), the mixture of biotinylated lectins 2UEA-1/GSL-I (Mixture 5: UEA-1 and GSL-I in a non-equimolar quantity, UEA-1 being in a quantity twice that of GSL-I), the mixture of biotinylated lectins 3UEA-1/GSL-I (Mixture 6: UEA-1 and GSL-I in a non-equimolar quantity, UEA-1 being in a quantity 3 times greater than that of GSL-I) and the mixture of biotinylated lectins 4UEA-1/GSL-I (Mixture 7: UEA-1 and GSL-I in a non-equimolar quantity, UEA-1 being in a quantity 4 times greater than that of GSL-I). The method according to the present invention therefore makes it possible to obtain stem cells capable of reforming tumours (results not presented).

Example 3: Visible Labelling of Lectins on Waxed Histological Section: Example of Lung Cancer Equipment used: Paraffin blocks, Ice, Microtome, Microtome, Superfrost® blades, Bond Max Automate (Leica Microsystems) with computer, Leica consumables (alcohol, wash buffer, ER1 buffer, dewax buffer, labels, coverslips, tubes), PBS-BSA buffer 5%, Biotinylated Lectins (UEA-1, Jacaline, ABA, ACA, GSL-I and GSL-II) (Vector Lab), Kit Bond Intense R detection (Leica), Leica mounting medium, slides and microscope.

The paraffin blocks containing lung cancer samples from each of the patients identified by their number (given by the pathological anatomy department) were placed in the ice for about 1 hour to be cooled, in order to facilitate their microtome section to a thickness of 5 μm.

The so-called "superfrost" slides, this for maximum adhesion of the sectioned tissue, were identified by the same numbers as those present on the blocks. A drop of water was placed in the center of each of these slides.

The section were made with a microtome and placed on the drop of water previously dropped-off. The slides were then placed on a hot plate at 37° C. to facilitate their adhesion and the excess water was removed. All the slides made were placed in an oven at 37° C. in order to dry them.

The next step was to use Leica's Bond Max Automaton connected to a computer with software to control the automaton.

During the time when the slides are in the oven, the entire immunohistochemical labelling process was prepared, starting with checking the level on the automaton of each of the products required to carry out the process, then identifying the slides with their same number on the software controlling the automaton. Labels allowing a standardized protocol have been generated. The dilution of lectins and their quantity has been calculated and the necessary kit prepared.

It should be noted that each of the products used had to be scanned and the level reset before each of the experiments were performed.

The labels were then stuck to their corresponding slides at the exit of the oven and coverslips, plastic elements placed on the section allowing a homogeneous distribution of the product over the entire surface of the slides during experiment thanks to the contact properties, were placed on each of the slides.

The slide holder was placed in the automaton and after the reader recognized each of the elements and the slides identified by their bar codes on the labels, the manipulation was initiated.

It began with heat dewaxing using Leica's Dewax product, subsequently allowing the accessibility of antibodies. This step and all the others were followed by washing, thanks to the Bond Wash 10× previously diluted, three times.

This step was followed by a 5-minute pretreatment with a citrate buffer at pH=6 (Leica's ER1 buffer), which makes it possible to unmask the antigens to be reached as part of this simple marking, i.e. to make them accessible.

The biotinylated lectin UEA-1 at 1/80 and the biotinylated lectin GSL-I at 1/200000 using the PBS BSA-5% diluent were placed simultaneously on the section for 20 minutes.

The Bond Intense R detection (Leica) kit, thanks to the intervention of streptavidin-HRP playing the role of secondary antibody, has made it possible through its properties to reveal these biotinylated lectins in dark thanks to the properties of DAB, the substrate for the HRP enzyme (horseradish peroxidase), which reveals the biotin/streptavidin-HRP complex.

A blue counter-colouring step using hematoxylin was then carried out for 7 minutes to make the entire sample identifiable.

The slides have been removed from the automaton. The section were then rehydrated by dipping the slides manually in an alcohol bath twice for 5 minutes. This rehydration step was followed by a toluene bath for 5 minutes as well.

The blades could then be mounted by putting a drop of mounting medium (Leica).

The slides were finally observed under a microscope and pictures were taken at magnification 20.

Figure 2A:
FIG. 2 shows the image of two tumour tissues of pulmonary origin, leading example of respiratory cancer, labelled by the mixture of UEA-1/GSL-I in equimolar quantity and from two different patients (upper image, noted 2A, corresponding to a first patient and lower image, noted 2B, corresponding to a second patient). Image 2B representing a tumor tissue simply marked by the mixture of lectins UEA-1/GSL-I shows a significant number of pulmonary cancer stem cells with a dark labelling (dark color around the cells, see arrow) labelling the presence of this sweet target (2B). On the contrary, image 2A has a perfect negativity. Thus, an agressivity criterion is defined by the specificity of the labelling targeting only cancer stem cells thanks to the mixture of UEA-1/GSL-I lectins on patients with the same pathology at the base.
Figure 2B:
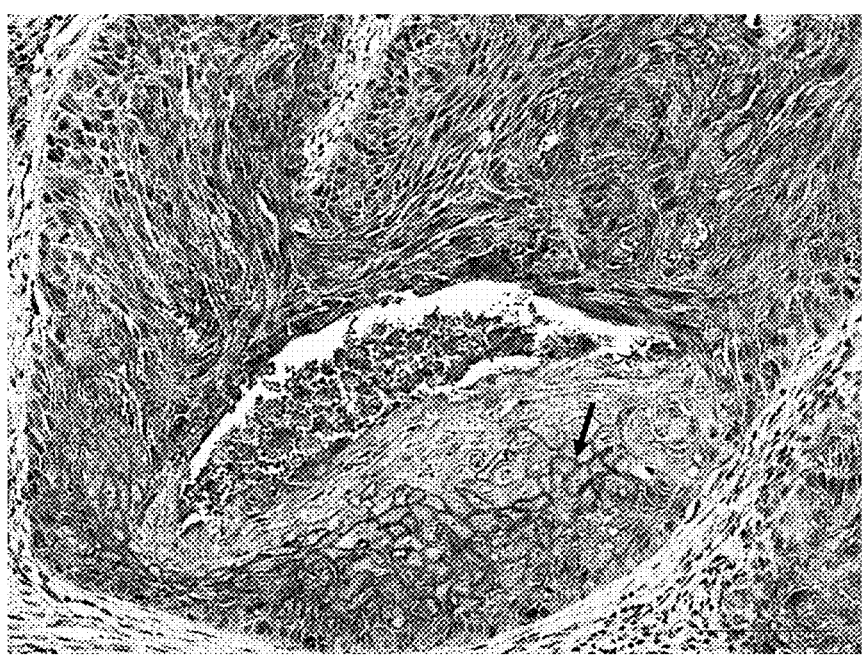

The results are presented in FIGS. 2A and 2B.

The results obtained highlight the ability of the lectins of the invention to selectively label cancer stem cells from lung tumor tissue.

The simple labelling of two pulmonary tumour tissues by the equimolar mixture of biotinylated lectins UEA-1/GSL-I makes it possible to observe that tissues, although having identical pathologies, may present a very different aggressiveness criterion.

Indeed, the specificity of the label according to the invention targeting cancer stem cells is well highlighted here because it shows a perfect negativity in the observation of the lung tumor tissue of the first patient (absence of dark color surrounding the cells) shown in FIG. 2A while a very strong positivity (dark color surrounding the cells, see arrow) is noted during the observation of the lung tumor tissue of the second patient (FIG. 2B). Increased aggressiveness (due to the presence of cancer stem cells) should be taken into account in the medical care of the patient.

Example 4: Visible Labelling with Lectins on Waxed Histological Section: Example of Laryngeal Cancer This example shows the labelling of laryngeal tumor tissues by the mixture UEA-1/GSL-I in equimolar quantity. The labelling was carried out according to the protocol described in example 3.

The results obtained highlight the ability of the lectins of the invention to selectively label cancer stem cells of laryngeal tumor tissue.

Figure 3A:
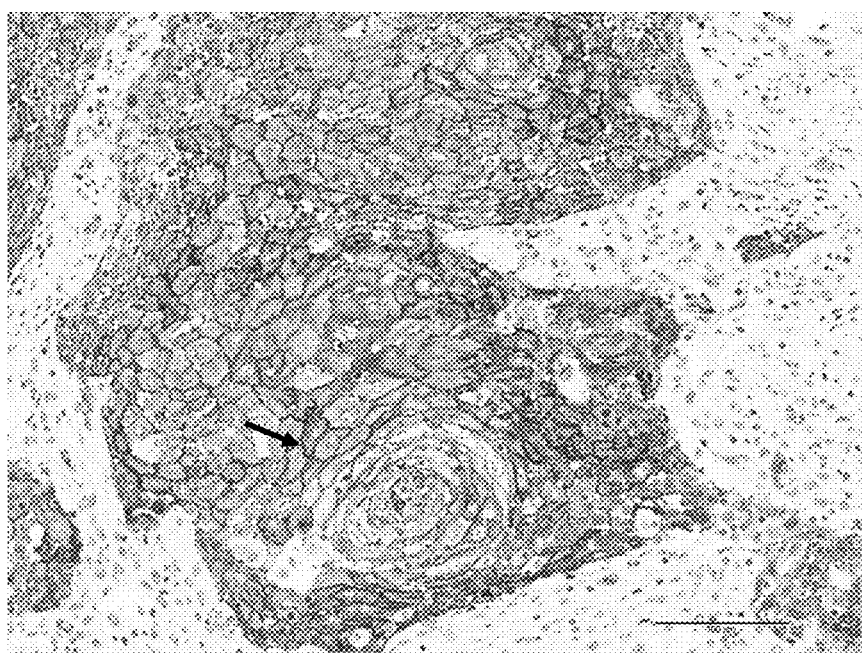
FIG. 3 shows a panel of tissues belonging to the respiratory tract (A: tongue, B: larynx, C: nose) labelled by the mixture UEA-1/GSL-I in equimolar quantity. The corresponding images of the tumour tissues labelled by the lectin mixture UEA-1/GSL-I show a significant number of cancer stem cells with a dark label (dark colour around the cells, see arrow) indicating the presence of cancer stem cells. Like the lung, an aggressiveness criterion is therefore defined by the specificity of the labelling targeting only cancer stem cells thanks to the mixture of lectins UEA-1/GSL-I in equimolar quantity on patients with cancer affecting the respiratory tract.
Figure 3B:
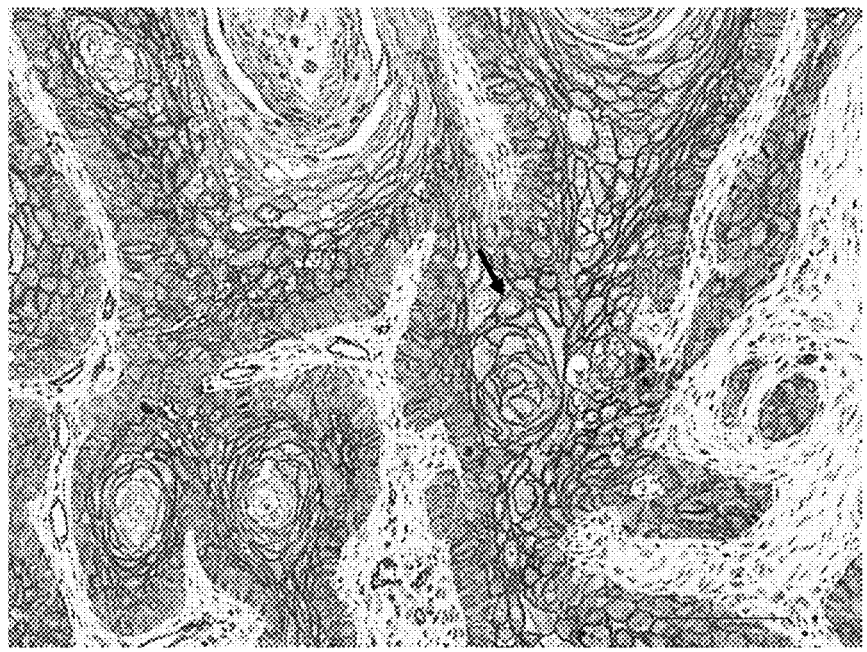

Indeed, FIG. 3B shows a very strong positivity (dark color around the cells, see arrow) when observing the laryngeal tumor tissue. Increased aggressiveness (due to the presence of cancer stem cells) should be taken into account in the medical care of the patient.

Example 5: Visible Labelling with Lectins on Waxed Histological Section: Example of Nose Cancer This example shows the labelling of tumour tissues from the nose by the mixture UEA-1/GSL-I in equimolar quantity. The labelling was carried out according to the protocol described in example 3.

The results obtained highlight the ability of the lectins of the invention to selectively label cancer stem cells of tumor tissues from the nose.

Figure 3C:

Indeed, FIG. 3C shows a very strong positivity (dark color around the cells, see arrow) when observing tumor tissue from the nose. Increased aggressiveness (due to the presence of cancer stem cells) should be taken into account in the medical care of the patient.

Example 6: Visible Labelling with Lectins on Waxed Histological Section: Example of Tongue Cancer This example shows the labelling of tumour tissues from the tongue by the mixture UEA-1/GSL-I in equimolar quantity. The labelling was carried out according to the protocol described in example 3.

The results obtained highlight the ability of the lectins of the invention to selectively label cancer stem cells of tumor tissue from the tongue.

Indeed, FIG. 3A shows a very strong positivity (dark color around the cells, see arrow) when observing tumor tissue from the tongue. Increased aggressiveness (due to the presence of cancer stem cells) should be taken into account in the medical care of the patient.

Example 7: Visible Labelling with Lectins on Waxed Histological Section: Example of Pharyngeal Cancer This example shows the marking of tumour tissues from the pharynx by the mixture UEA-1/GSL-I in equimolar quantity. The marking was carried out according to the protocol described in example 3.

The results obtained highlight the ability of the invention's lectins to selectively mark cancer stem cells of tumor tissue from the pharynx.

Example 8: Visible Labelling with Lectins on Waxed Histological Section: Example of Oral Cancer This example shows the labelling of tumour tissues from the mouth by the mixture UEA-1/GSL-I in equimolar quantity. The labelling was carried out according to the protocol described in example 3.

The results obtained highlight the ability of the lectins of the invention to selectively label cancer stem cells of tumor tissue from the mouth.

Example 9: Visible Labelling with Lectins on Waxed Histological Section: Example of Throat Cancer This example shows the labelling of tumour tissues from the throat by the mixture UEA-1/GSL-I in equimolar quantity. The labelling was carried out according to the protocol described in example 3.

The results obtained highlight the ability of the lectins of the invention to selectively label cancer stem cells of tumor tissue from the throat.

Example 10: Visible Labelling with Lectins on Waxed Histological Section: Example of Tracheal Cancer This example shows the labelling of tumour tissues from the trachea with the mixture UEA-1/GSL-I in equimolar quantity. The labelling was carried out according to the protocol described in example 3.

The results obtained highlight the ability of the lectins to the invention to selectively label cancer stem cells of tumor tissue from the trachea.

Example 11: Visible Labelling with Lectins on Waxed Histological Section: Example of Sinus Cancer This example shows the labelling of tumour tissues from the sinuses by the mixture UEA-1/GSL-I in equimolar quantity. The labelling was carried out according to the protocol described in example 3.

The results obtained highlight the ability of the lectins of the invention to selectively label cancer stem cells of tumor tissue from the sinuses.

Example 12: Visible Labelling with Lectins on Waxed Histological Section: Example of Tonsil Cancer (Example of Salivary Gland Cancer)

This example shows the labelling of tumour tissues from the tonsils by the mixture UEA-1/GSL-I in equimolar quantity. The labelling was carried out according to the protocol described in example 3.

The results obtained highlight the ability of lectins of the invention to selectively label cancer stem cells of tumor tissue from the tonsils.

Example 13: Visible Marking with Lectins on Waxed Histological Section: Example of Parotid Cancer (Example of Salivary Gland Cancer)

This example shows the labelling of tumour tissues from the parotid gland with the mixture UEA-1/GSL-I in equimolar quantity. The labelling was carried out according to the protocol described in example 3.

The results obtained highlight the ability of lectins of the invention to selectively label cancer stem cells of tumor tissue from the parotid gland.

Examples 3 to 13 show that the simple labelling of tumour tissues belonging to the respiratory tract by the equimolar mixture of biotinylated UEA-1/GSL-I lectins makes it possible to observe that tissues with identical pathologies may have a very different aggressiveness criterion. Increased aggressiveness, in these cases with various cancerous pathologies but belonging to the respiratory tract, must be taken into account in the medical care of the patient.

The invention claimed is:

1. An in vitro method for isolating cancer stem cells of organs involved in respiration in a biological sample comprising:
   (a) a step of labelling the cancer stem cells of organs involved in respiration with at least one lectin recognizing the fucose α 1-2 galactose group, said lectin being conjugated to biotin or a fluorophore, to obtain a biological sample in which the cancer stem cells of organs involved in respiration are labelled with at least one lectin,
   followed by
   (b) a step of isolating said cancer stem cells of organs involved in respiration labelled with at least one lectin,
   said isolation step being carried out via a support functionalized with streptavidin or avidin constituted by magnetic beads and in the presence of a magnet, when said lectin is conjugated to biotin,
   and said isolation step being carried out by cell sorting in flow cytometry, when said lectin is conjugated to a fluorophore,
   wherein said at least one lectin is chosen from the lectins UEA-1 or its homologue TJA-II, ABA, ACA, jacalin, GSL-I and GSL-II.

2. The in vitro method of isolation according to claim 1, wherein said fucose α 1-2 galactose group is the fucose α 1-2 galactose β 1-4 N-acetylglucosamine group.

3. The in vitro method of isolation according to claim 1, wherein said at least one lectin is at least two lectins chosen from UEA-1 or its homologue TJA-II, ABA, ACA, jacalin, GSL-I and GSL-II.

4. The in vitro method of isolation according to claim 1, wherein the at least one lectin comprises at least two lectins, said at least two lectins being in equal or unequal quantity.

5. The in vitro method of isolation according to claim 1, wherein the at least one lectin comprises at least two lectins, said at least two lectins being in non-equimolar quantity,
   wherein said at least two lectins comprise UEA-1 and GSL-I in a non-equimolar quantity in a weight ratio of 2:1, 3:1 or 4:1.

6. The in vitro method of isolation according to claim 1, wherein said biological sample is a biological sample of organs involved in respiration, and wherein said organ involved in respiration is selected from the lung, larynx, pharynx, mouth, nose, throat, tongue, sinus, trachea, salivary gland, tonsil, and parotid gland.

7. The in vitro method of isolation according to claim 1, said method of isolation being followed by the detection of cancer stem cells of organs involved in respiration in a biological sample, said detection comprising:
   (a) a step of labelling the cancer stem cells of organs involved in respiration with at least one lectin recognizing the fucose α 1-2 galactose group, said lectin being conjugated to a label chosen from: a fluorophore or biotin, to obtain a biological sample in which the cancer stem cells of organs involved in respiration are labelled by at least one lectin,
   followed by
   (b) a step of detecting said cancer stem cells of organs involved in respiration labelled with at least one lectin.

8. Method of making an isolated population of cancer stem cells, comprising
   (a) a step of labelling the cancer stem cells of organs involved in the respiration of a biological sample of organs involved in respiration with at least one lectin recognizing the fucose α 1-2 galactose unit, said lectin being conjugated to biotin or a fluorophore, to obtain a biological sample in which the cancer stem cells of organs involved in respiration are labelled with at least one lectin, followed by
   (b) a step of isolating said cancer stem cells of organs involved in respiration labelled with at least one lectin,
   said isolation step being carried out via a support functionalized with streptavidin or avidin constituted by magnetic beads and in the presence of a magnet, when said lectin is conjugated to biotin,
   and said isolation step being carried out by cell sorting in flow cytometry, when said lectin is conjugated to a fluorophore,
   wherein said at least one lectin is chosen from the lectins UEA-1 or its homologue TJA-II, ABA, ACA, jacalin, GSL-I and GSL-II,
   to obtain cancer stem cells of organs involved in respiration labelled by at least one lectin in said sample.

9. The method according to claim 8, wherein the fucose α 1-2 galactose group is the fucose α 1-2 galactose β 1-4 N-acetylglucosamine group.

10. The method according to claim 8, wherein said at least one lectin is at least two lectins chosen from UEA-1 or its homologue TJA-II, ABA, ACA, jacalin, GSL-I and GSL-II.

11. The method according to claim 10, wherein the at least two lectins are in equal quantity.

12. The method according to claim 10, wherein the at least two lectins are in non-equimolar quantity.

13. The method according to claim 8, wherein said biological sample is a biological sample of organs involved in respiration and wherein said organ involved in respiration is selected from the lung, larynx, pharynx, mouth, nose, throat, tongue, sinus, trachea, salivary gland, tonsil, and parotid gland.

14. The method according to claim 8, wherein said cancer is selected from lung cancer, laryngeal cancer, pharyngeal cancer, oral cancer, nose cancer, throat cancer, tongue cancer, sinus cancer, tracheal cancer, cancer of the salivary glands, tonsil cancer, and parotid gland cancer.

* * * * *